(12) United States Patent
Kanai

(10) Patent No.: US 9,316,538 B2
(45) Date of Patent: Apr. 19, 2016

(54) LIGHT MEASURING DEVICE, PRINTING APPARATUS, AND IMAGE DISPLAY APPARATUS

(71) Applicant: Seiko Epson Corporation, Tokyo (JP)

(72) Inventor: Masashi Kanai, Azumino (JP)

(73) Assignee: Seiko Epson Corporation (JP)

( * ) Notice: Subject to any disclaimer, the term of this patent is extended or adjusted under 35 U.S.C. 154(b) by 22 days.

(21) Appl. No.: 14/215,723

(22) Filed: Mar. 17, 2014

(65) Prior Publication Data
US 2014/0267459 A1    Sep. 18, 2014

(30) Foreign Application Priority Data

Mar. 18, 2013  (JP) .................................. 2013-054681
Feb. 21, 2014  (JP) .................................. 2014-031414

(51) Int. Cl.
| | |
|---|---|
| *G01J 3/02* | (2006.01) |
| *B41J 2/125* | (2006.01) |
| *G09G 5/02* | (2006.01) |
| *B41J 11/00* | (2006.01) |
| *G01J 3/10* | (2006.01) |
| *G01J 3/26* | (2006.01) |
| *G01J 3/50* | (2006.01) |
| *G01J 3/51* | (2006.01) |

(52) U.S. Cl.
CPC ................ *G01J 3/0218* (2013.01); *B41J 2/125* (2013.01); *B41J 11/009* (2013.01); *G01J 3/027* (2013.01); *G01J 3/10* (2013.01); *G01J 3/26* (2013.01); *G01J 3/506* (2013.01); *G01J 3/51* (2013.01); *G09G 5/02* (2013.01); *G09G 2320/0626* (2013.01); *G09G 2320/0666* (2013.01); *G09G 2320/0693* (2013.01); *G09G 2320/08* (2013.01); *G09G 2360/145* (2013.01)

(58) Field of Classification Search
None
See application file for complete search history.

(56) References Cited

U.S. PATENT DOCUMENTS

2007/0030505 A1   2/2007  Ito et al.
2013/0127946 A1*  5/2013  Kanai ............................. 347/19

FOREIGN PATENT DOCUMENTS

| JP | 2007-043488 A | 2/2007 |
| JP | 2010-044001 A | 2/2010 |
| JP | 2012-127917 A | 7/2012 |
| JP | 2013-107269 A | 6/2013 |

OTHER PUBLICATIONS

Article regarding the LEONI switcher from http://www.optosirius.co.jp/LEONI/application.html (with English translation), copyright © 2009 OptoSirius Corporation, one page, printed Mar. 4, 2014.

* cited by examiner

*Primary Examiner* — Kenneth B Lee, Jr.
(74) *Attorney, Agent, or Firm* — Harness, Dickey & Pierce, P.L.C.

(57) ABSTRACT

A light measuring device can measure, in one place, a plurality of lights guided from different places. The light measuring device includes a spectroscope configured to selectively transmit light having a desired wavelength, a plurality of light guiding units configured to guide measurement target light to the spectroscope, and a light receiving unit configured to receive the light emitted from the spectroscope. The light guiding units are provided in positions where different lights are respectively made incident on incident ends of the light guiding units as the measurement target light and positions where emission ends of the light guiding units respectively emit lights to different positions of the spectroscope. The spectroscope emits the lights, which are made incident from the light guiding units, respectively from different positions. The light receiving unit separately receives the lights emitted from the different positions of the spectroscope.

10 Claims, 23 Drawing Sheets

LIGHT MEASURING DEVICE, PRINTING APPARATUS, AND IMAGE DISPLAY APPARATUS

BACKGROUND

1. Technical Field

The present invention relates to a light measuring device, a printing apparatus, and image display apparatus.

2. Related Art

JP-A-2012-127917 (Patent Literature 1) discloses a wavelength selection type infrared detection apparatus including one variable Fabry-Perot first filter including mirrors arranged to be opposed to each other, a second filter including a band-pass section that selectively transmits light in a predetermined band, the band-pass section being provided to correspond to a mirror, and an infrared detector that detects, with an infrared detection device, the light transmitted by the band-pass section. In the wavelength selection type infrared detection apparatus described in Patent Literature 1, the first filter transmits interference lights of a plurality of orders. The band-pass section has a light transmission characteristic corresponding to a modulation band that interference light of an arbitrary order can take according to a change in a gap length. The second filter includes a plurality of kinds of the band-pass sections respectively corresponding to interference lights of different orders. The infrared detector includes a plurality of infrared detection devices to detect, with a different infrared detection device for each of the types of the band-pass sections, interference light transmitted through the second filter.

In the invention described in Patent Literature 1, lights having a plurality of different wavelengths can be simultaneously detected. However, the lights having the different wavelengths are included in the same optical path. That is, in the invention described in Patent Literature 1, it is difficult to efficiently measure lights guided from a plurality of remote places, a plurality of places separated from one another, or the like, that is, lights in different optical paths.

SUMMARY

An advantage of some aspects of the invention is to provide a light measuring device, a printing apparatus, and an image display apparatus that can measure, in one place, a plurality of lights guided from different places.

A first aspect of the invention is directed to a light measuring device including: a spectroscope configured to selectively transmit light having a desired wavelength; a plurality of light guiding units configured to guide measurement target light to the spectroscope; and a light receiving unit configured to receive the light emitted from the spectroscope. The plurality of light guiding units are provided in positions where different lights are respectively made incident on incident ends of the plurality of light guiding units as the measurement target light and positions where emission ends of the plurality of light guiding units respectively emit lights to different positions of the spectroscope. The spectroscope emits the lights, which are made incident from the plurality of light guiding units, respectively from different positions. The light receiving unit separately receives the lights emitted from the different positions of the spectroscope.

According to the first aspect, different lights are respectively made incident on the incident ends of the plurality of light guiding units as measurement target light. The lights are respectively emitted from the emission ends of the plurality of light guiding units to the different positions of the spectroscope. The spectroscope emits the lights, which are made incident from the plurality of light guiding units, respectively from the different positions. The light receiving unit separately receives the lights emitted from the different positions of the spectroscope. Consequently, it is possible to measure, in one place, a plurality of lights guided from different places. Since only one spectroscope is provided, individual difference adjustment among spectroscopes is unnecessary. Therefore, it is possible to reduce the size of the light measuring device.

The light receiving unit may be an area sensor in which a plurality of sensors are two-dimensionally arranged. The lights made incident on the spectroscope from the plurality of light guiding units may be received by different sensors of the area sensor. Consequently, it is possible to detect, with one area sensor, a plurality of lights guided from different places. Further, it is possible to expand a light receiving area and increase measurement sensitivity.

The light measuring device may include a control unit configured to control the light measuring device. The control unit may include: a wavelength selecting unit configured to select a wavelength transmitted through the spectroscope; and an acquiring unit configured to acquire, while changing the desired wavelength with the wavelength selecting unit, a light reception result in the light receiving unit to acquire a relation between a wavelength and light intensity of the measurement target light. Consequently, it is possible to acquire the relation between the wavelength and the light intensity of the measurement target light.

The light measuring device may include an output unit configured to output the measurement target light or output a color onto a medium on which light is reflected to be the measurement target light. The control unit may include an information creating unit configured to create, on the basis of the relation between the wavelength and the light intensity of the measurement target light acquired by the acquiring unit, correction information for correcting the output of the output unit. Consequently, it is possible to correct the output of the output unit on the basis of the relation between the wavelength and the light intensity of the measurement target light.

A second aspect of the invention is directed to a printing apparatus that prints an image on a printing medium, the printing apparatus including: the light measuring device; a printing-medium-discrimination-information acquiring unit configured to acquire printing medium discrimination information that associates information specifying a printing medium with respect to a plurality of printing media and a relation between a wavelength and light intensity of light reflected on the printing medium; and a printing-medium discriminating unit configured to discriminate a type of the printing medium on the basis of the printing medium discrimination information and the relation between the wavelength and the light intensity of the measurement target light acquired by the acquiring unit. Consequently, it is possible to incorporate the light measuring device in the printing apparatus and discriminate a type of a printing medium.

The light guiding unit may guide diffused reflected light of the printing medium and regular reflection light of the printing medium or transmitted light of the printing medium to the spectroscope. Consequently, it is possible more accurately discriminate the printing medium.

A third aspect of the invention is directed to a printing apparatus that prints an image on a printing medium, the printing apparatus including the light measuring device. The output unit ejects ink to the printing medium. The light receiving unit receives light reflected on the printing medium to which the ink is ejected by the output unit. The information creating unit creates, as the correction information, information specifying a relation between a color value and an ink amount on the printing medium. Consequently, it is possible to create the information specifying the relation between the color value and the ink amount and adjust an ink amount ejected to the printing medium, that is, a color after printing.

The plurality of light guiding units may be provided in positions where lights reflected in different positions on the printing medium can be simultaneously acquired. Consequently, it is possible to create, in a short time, the information specifying the relation between the color value and the ink amount. Further, it is possible to take into account irregularity of the printing medium.

A fourth aspect of the invention is directed to an image display apparatus that causes a display unit, which is a display screen or a projection surface, to display an image, the image display apparatus including: the light measuring device; and an acquiring unit configured to acquire image data. The output unit causes the display unit to display a predetermined color. The light guiding unit emits the predetermined color displayed on the display unit to the spectroscope as the measurement target light. The information creating unit creates correction data used for color correction performed when the output unit outputs the image data. Consequently, it is possible to correct an output of the display unit using the created correction data and cause the display unit to display with an appropriate brightness, an appropriate color, and the like.

The light guiding unit may emit, together with the predetermined color, light of external lighting to the spectroscope as the measurement target light. The information creating unit may create the correction data on the basis of the light of the external lighting. Consequently, it is possible to cause the display unit to display an image at appropriate brightness, an appropriate color, and the like according to the external lighting.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained with reference to the drawings.

First Embodiment

Figure 1:
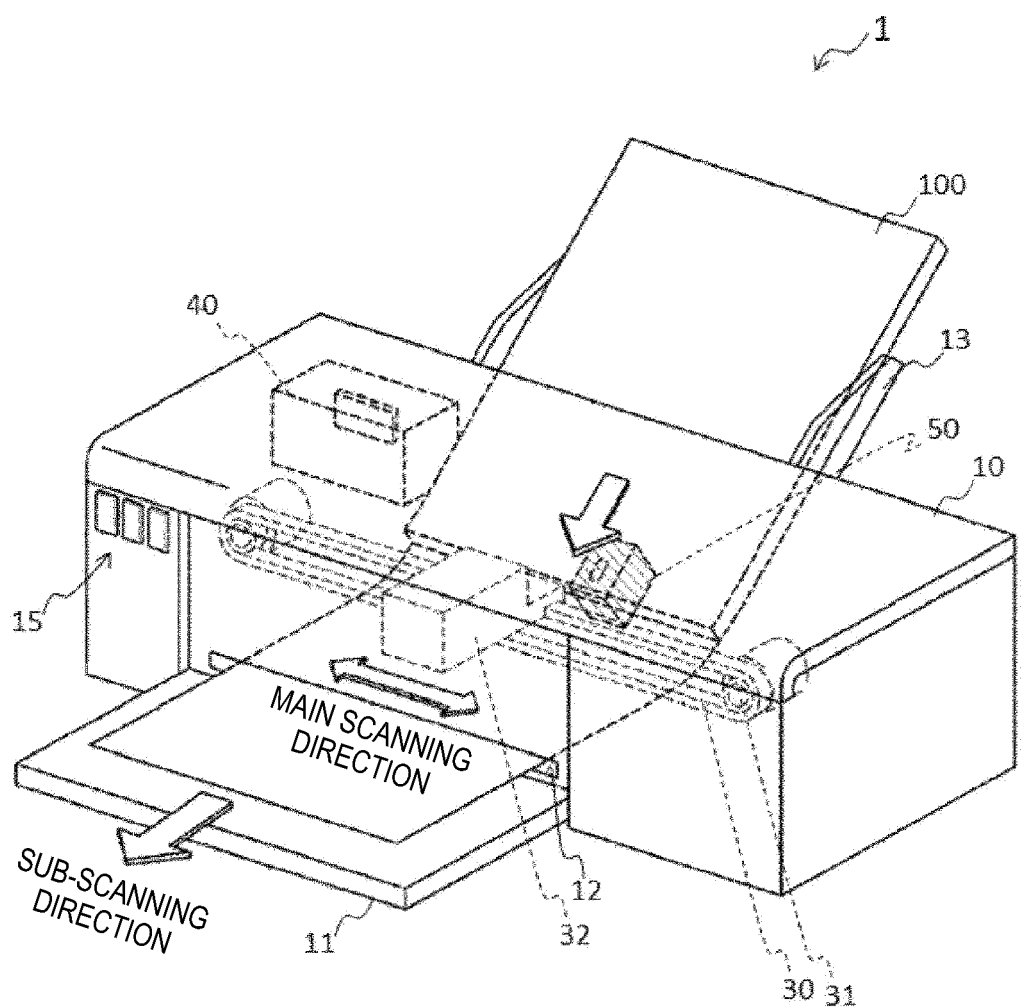
FIG. 1 is a diagram showing an example of the configuration of a printing apparatus in a first embodiment.

FIG. 1 is a diagram showing the configuration of a printing apparatus 1 in a first embodiment of the invention. The printing apparatus 1 in this embodiment is a so-called ink-jet printer that ejects ink to the surface of a printing medium 100 and prints an image.

A housing 10 has a box-like external shape. A front cover 11 is provided substantially in the center of the front surface of the housing 10. A plurality of operation buttons 15 are provided beside the front cover 11. The front cover 11 is axially supported on the lower end side. When the upper end side is laid to the near side, an elongated discharge port 12, to which a printing medium 100 is discharged, appears.

A paper feeding tray 13 is provided on the back side of the housing 10. When the printing medium 100 is set in the paper feeding tray 13 and the operation buttons 15 are operated, the printing medium 100 is drawn in from the paper feeding tray 13 and, after an image is printed on the surface of the printing medium 100 on the inside of the housing 10, discharged from the discharge port 12.

On the inside of the housing 10, a control unit 40 and a light measuring device 50 are mainly provided. The control unit 40 and the light measuring device 50 are explained in detail below.

Figure 2:
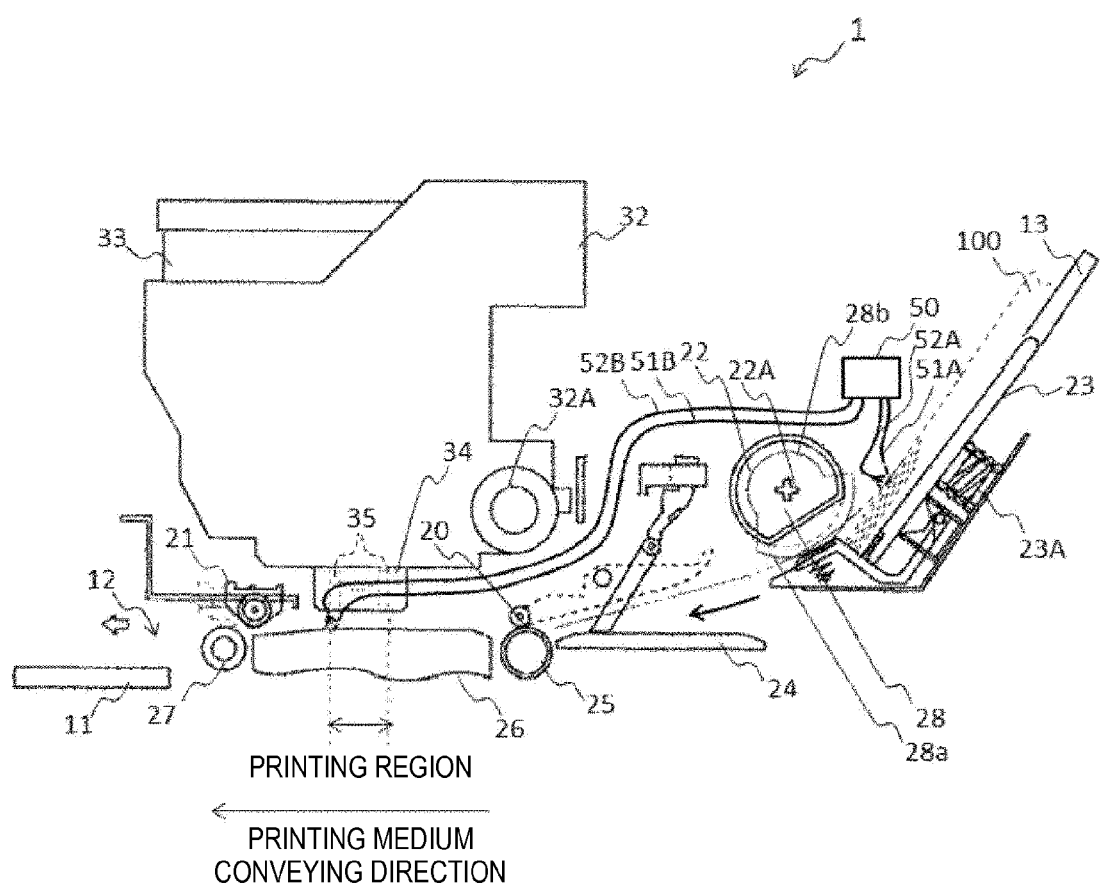
FIG. 2 is a diagram showing an example of the configurations of a conveying mechanism and an ink ejecting mechanism of the printing apparatus.

The printing apparatus 1 includes a conveying mechanism for conveying the printing medium 100 placed on the paper feeding tray 13 to the discharge port 12 and an ink ejecting mechanism for ejecting ink to a printing medium such as the printing medium 100 conveyed by the conveying mechanism. FIG. 2 is a diagram showing an example of the configurations of the conveying mechanism and the ink ejecting mechanism.

The conveying mechanism includes an LD roller 22 functioning as a first paper feeding roller, a hopper 23 functioning as a nip member, a sheet guide 24, a PF roller 25 functioning as a second paper feeding roller, a platen 26, and a paper discharge roller 27.

The hopper 23 is disposed at the lower end of the paper feeding tray 13. A flat surface, on which the printing medium 100 can be placed, is formed by the hopper 23 and the paper feeding tray 13. The hopper 23 and the paper feeding tray 13 are disposed in an inclined posture with the hopper 23 side set on the lower side. Consequently, the printing medium 100 placed on the paper feeding tray 13 is positioned on the hopper 23. In a joining portion to the paper feeding tray 13, the hopper 23 is disposed rotatably about a rotation axis set in a direction substantially perpendicular to the paper surface of FIG. 2.

The LD roller 22 is formed in a substantially D shape in side obtained by cutting out the side of a column. The LD roller 22 is disposed in a rotating shaft 22A disposed in the direction substantially perpendicular to the paper surface of FIG. 2. A cam for gap 28 is further disposed on the rotating shaft 22A. The cam for gap 28 includes a large diameter section 28a a size larger than the outer circumference of the LD roller 22 and a small diameter section 28b a size smaller than the outer circumference of the LD roller 22. The large diameter section 28a of the cam for gap 28 is provided to correspond to, for example, a cutout portion of the LD roller 22. The remaining portion is the small diameter section 28b. A recess is formed in the large diameter section 28a of the cam for gap 28.

The LD roller 22 and the cam for gap 28 are disposed near the hopper 23. A hopper spring 23A is disposed on the rear surface of the hopper 23. A force in the LD roller 22 direction is applied to the hopper 23 by the force of the hopper spring 23A. Consequently, in a state in which the printing apparatus 1 is stopped, a projection formed at the lower end of the hopper 23 fits in the recess of the cam for gap 28.

When the LD roller 22 rotates counterclockwise in FIG. 2, the lower end edge of the hopper 23 comes off the recess of the cam for gap 28 and comes into contact with the large diameter section 28a of the cam for gap 28. When the LD roller 22 further rotates counterclockwise in FIG. 2, the lower end edge of the hopper 23 comes off the large diameter section 28a of the cam for gap 28 and comes into contact with the small diameter section 28b of the cam for gap 28. At this point, a space between the hopper 23 and the LD roller 22 is minimized. When the printing medium 100 is present on the hopper 23, the printing medium 100 comes into contact with the LD roller 22. As a result, the printing medium 100 on the paper feeding tray 13 is nipped by the LD roller 22 and the hopper 23.

When the LD roller 22 further rotates counterclockwise in FIG. 2, the printing medium 100 in contact with the LD roller 22 is conveyed in the lower left direction (see an arrow) in FIG. 2 according to the rotation of the LD roller 22. When the LD roller 22 rotates once, the LD roller 22 stops in a state in which the projection formed at the lower end of the hopper 23 is fit in the recess of the cam for gap 28.

The sheet guide 24, the PF roller 25, and the paper discharge roller 27 are disposed in a row along a conveying route for a printing medium (a sub-scanning direction in FIG. 1) between the LD roller 22 and the discharge port 12.

The sheet guide 24 is a tabular member, the upper surface of which is substantially flat.

The PF roller 25 is a substantially columnar roller. A driven roller 20 having a substantially columnar shape is disposed on the upper side of the PF roller 25. The PF roller 25 and the driven roller 20 are disposed rotatably about a rotation axis set in the direction substantially perpendicular to the paper surface of FIG. 2.

The platen 26 includes a substantially flat plate member and a plurality of ribs formed on the upper surface of the plate member.

The paper discharge roller 27 is a substantially columnar roller. A driven roller 21 having a substantially columnar shape is disposed on the upper side of the paper discharge roller 27. The paper discharge roller 27 and the driven roller 21 are disposed rotatably about a rotation axis set in a direction substantially perpendicular to the paper surface of FIG. 1.

The ink ejecting mechanism is disposed on the upper side of the conveying mechanism having the configuration explained above. The ink ejecting mechanism mainly includes a carriage 32, an ink tank 33, and a recording head 34.

The carriage 32 is located above the platen 26. The carriage 32 is connected to a timing belt 30 (see FIG. 1), on the inner side of which a plurality of tooth forms are formed, and a driving unit including a driving motor 31 (see FIG. 1) configured to drive the timing belt 30. When the timing belt 30 is driven, the carriage 32 is moved along the axial direction of a carriage shaft 32A.

On the lower surface of the carriage 32, a recording head 34 including a plurality of ink ejection nozzles 35 is disposed. A region between a scanning range of the recording head 34 and the platen 26 is a printing region where ink is ejected to the printing medium 100. The printing region is a predetermined paper feeding position targeted by the printing apparatus 1 in this embodiment.

The ink tank 33 is disposed on the carriage 32. Ink stored in the ink tank 33 is supplied to the plurality of ink ejection nozzles 35. Piezoelectric elements to be deformed by an applied voltage are disposed in the ink ejection nozzles 35. When the piezoelectric elements are deformed, the ink is ejected from the ink ejection nozzles 35.

Referring back to FIG. 1, on the inside of the housing 10, the control unit 40 configured to control the operations of the conveying mechanism, the ink ejecting mechanism, and the light measuring device 50 (explained in detail below) is mounted. After applying predetermined image processing to image data of an image about to be printed, the control unit 40 determines a jetting amount of the ink on the basis of a result of the image processing. The control unit 40 prints the image by controlling the conveying mechanism and the ink ejecting mechanism. A memory having stored therein various computer programs, various data, and the like for the image processing is mounted on the control unit 40.

It is desirable to change, according to a type of the printing medium 100, content of the image processing applied to the image data. For example, when the printing medium 100 is a medium more yellowish than usual, a yellowish image is formed if the printing medium 100 is printed in the same manner as usual. Therefore, it is desirable to change the content of the image processing in order to print an image with a yellow color suppressed more than usual. When the ink oozes on the surface of the printing medium 100, in some case, ejected inks are mixed and image quality is deteriorated. Further, when the printing medium 100 is swelled by the ink, creases occur on the surface of the printing medium 100 and cause deterioration in image quality. Easiness of oozing of the ink or the like changes according to a type of the printing medium 100. Therefore, if the content of the image processing is switched according to the type of the printing medium 100, it is possible to prevent such a problem from occurring.

Therefore, as shown in FIG. 2, in this embodiment, the light measuring device 50 is provided such that light in a place of the paper feeding tray 13 where the printing medium 100 is set can be detected. Light emitted from an optical fiber for light source 51A is reflected on the printing medium 100, made incident on an optical fiber for light reception 52A, and detected by the light measuring device 50. Consequently, it is possible to discriminate the type of the printing medium 100.

It is possible to further improve the image quality by checking a result of the printing on the printing medium 100. Therefore, in this embodiment, the light measuring device 50 is provided such that light reflected on the printing medium 100 passed below the recording head 34 can be detected. The light emitted from an optical fiber for light source 51B is reflected on the printing medium 100, made incident on an optical fiber for light reception 52B, and detected by the light measuring device 50. Consequently, it is possible to detect a color of a printed image.

As shown in FIG. 2, the optical fibers for light source 51A and 51B, one ends of which are connected to a light source 53 (not shown in FIG. 2 and explained in detail below), and the optical fibers for light reception 52A and 52B, which receive lights respectively emitted from the optical fibers for light source 51A and 51B, are connected to the light measuring device 50. The optical fibers for light source 51A and 51B and the optical fibers for light reception 52A and 52B have thickness of about 1 mm in diameter. The optical fibers for light source 51A and 51B and the optical fibers for light reception 52A and 52B are equivalent to the light guiding unit according to the invention.

The optical fibers for light source 51A and 51B guide lights of the light source 53 respectively to different places. The optical fibers for light source 51A and 51B are provided in positions where lights emitted from the end faces thereof are irradiated on the printing medium 100.

The optical fibers for light reception 52A and 52B acquire the lights reflected on the printing medium 100 and guide the lights to the light measuring device 50. The optical fibers for light reception 52A and 52B are provided in positions where the lights reflected on the printing medium 100 are made incident on the end faces of the optical fibers for light reception 52A and 52B.

In this embodiment, the optical fiber for light source 51B and the optical fiber for light reception 52B are provided in the recording head 34. However, the optical fiber for light source 51B and the optical fiber for light reception 52B are not limited to this form. The optical fiber for light source 51B and the optical fiber for light reception 52B may be provided in any positions as long as lights can be irradiated on the printed printing medium 100 and the lights reflected on the printing medium 100 can be acquired in the positions. For example, the optical fiber for light source 51B and the optical fiber for light reception 52B may be provided on a discharge route of the printing medium 100 after printing.

The optical fiber for light source 51B and the optical fiber for light reception 52B are desirably movable in a main scanning direction shown in FIG. 1. If optical fiber for light source 51B and the optical fiber for light reception 52B are provided in the recording head 34, the optical fiber for light source 51B and the optical fiber for light reception 52B can be moved in the main scanning direction. However, a rail may be provided along the main scanning direction and optical fiber for light source 51B and the optical fiber for light reception 52B may be provided movably on the rail.

In this embodiment, the optical fibers for light source 51A and 51B and the optical fibers for light reception 52A and 52B are used as means for guiding lights. However, the means for guiding lights is not limited to this form as long as the lights can be guided.

Figure 3:
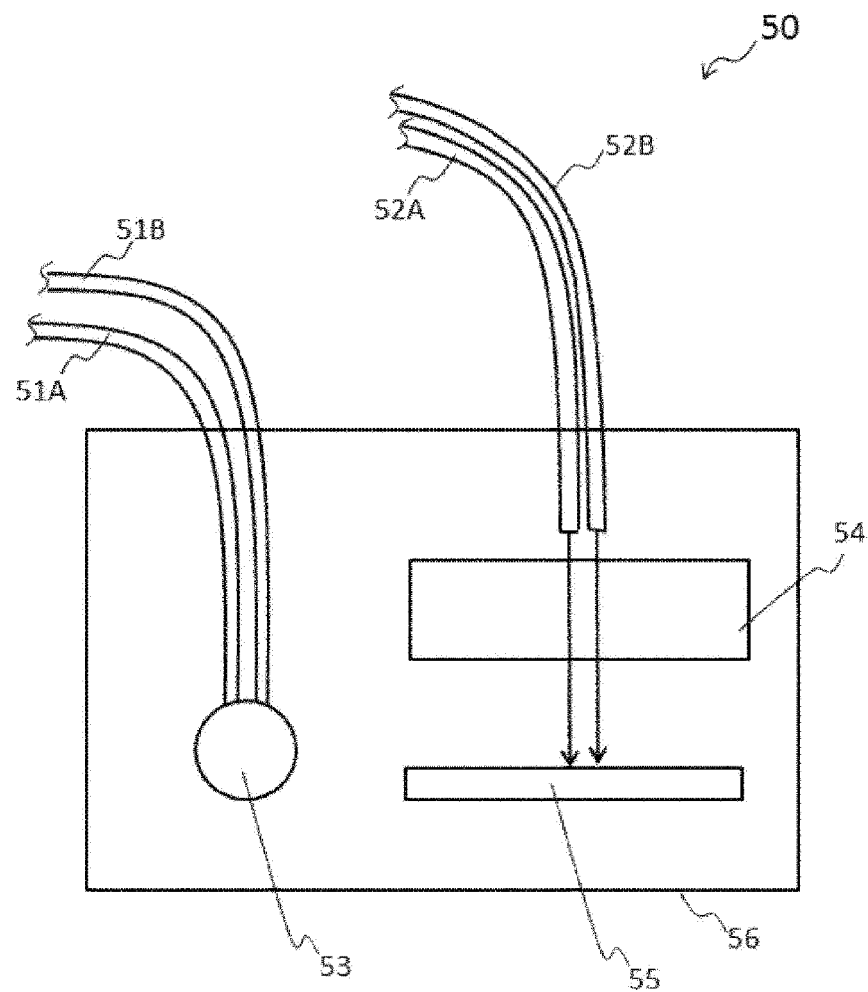
FIG. 3 is a diagram showing an example of the configuration of a light measuring device.

FIG. 3 is a main part perspective view showing an example of the internal configuration of the light measuring device 50.

The light measuring device 50 includes the light source 53, a spectroscope 54 on which lights emitted from the optical fibers for light reception 52A and 52B are made incident, a light receiving unit 55 configured to detect the lights passed through the spectroscope 54, and a case 56 configured to house these devices.

The light source 53 is controlled by the control unit 40 to thereby irradiate light having predetermined intensity toward the printing medium 100 via the optical fibers for light source 51A and 51B. As the light source 53, a halogen lamp, an LED, or the like can be used. However, it is desirable that light in a certain degree of a wavelength range (e.g., a visible region or an ultraviolet region) can be generated.

The light receiving unit 55 is an area sensor in which a plurality of sensors are two-dimensionally arranged. The area sensor generates a signal according to light intensity of received light like a so-called photodiode. As the area sensor used in the light receiving unit 55, for example, a CMOS can be used. If a correspondence relation between the positions of the optical fibers for light reception 52A and 52B and light receiving pixels in the area sensor is known in advance, it is possible to receive, with different pixels of the light receiving unit 55, lights respectively emitted from the optical fibers for light reception 52A and 52B.

The control unit 40 detects, while controlling the spectroscope 54 to change the wavelength of light to be transmitted, a signal from the light receiving unit 55 to thereby detect a spectrum of light (data of light intensities at respective wavelengths). If a spectrum of light irradiated on the printing medium 100 by the light source 53 (a spectrum of irradiated light) is checked in advance, it is also possible to calculate spectral reflectance by calculating a ratio of a spectrum of reflected light to the spectrum of the irradiated light at that point.

The spectroscope 54 functions as a so-called band-pass filter that transmits only light having a specific narrow wavelength. The wavelength of the light to be transmitted can be continuously changed or a plurality of wavelengths can be switched. In this embodiment, the spectroscope 54 having an extremely small size (about several millimeters in diameter), which makes use of the principle of a so-called Fabry-Perot interferometer, is used. The optical fibers for light source 51A and 51B and the optical fibers for light reception 52A and 52B have a diameter of about 1 mm. Therefore, it is possible to guide lights to the spectroscope 54 using several optical fibers for light source and optical fibers of light reception.

Figure 4A:
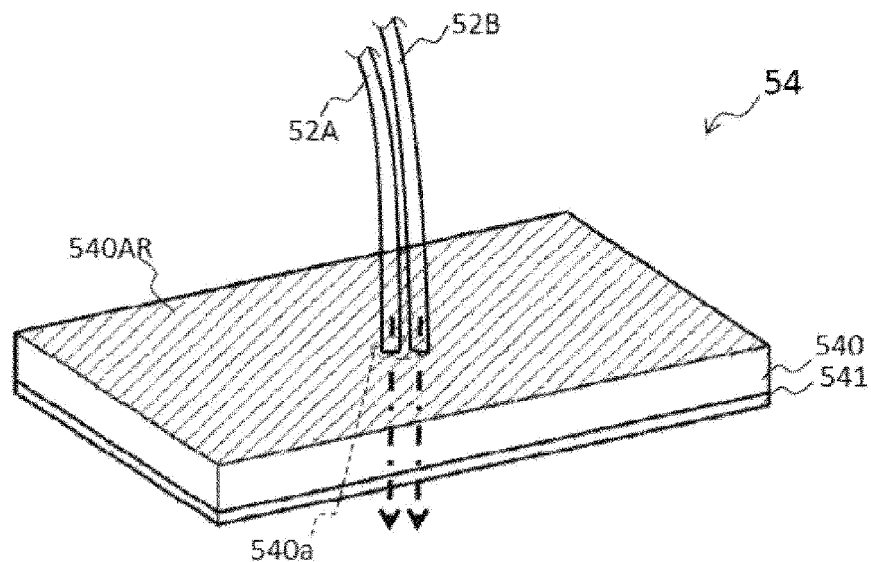
FIGS. 4A and 4B are diagrams showing an example of the configuration of a spectroscope.
Figure 4B:
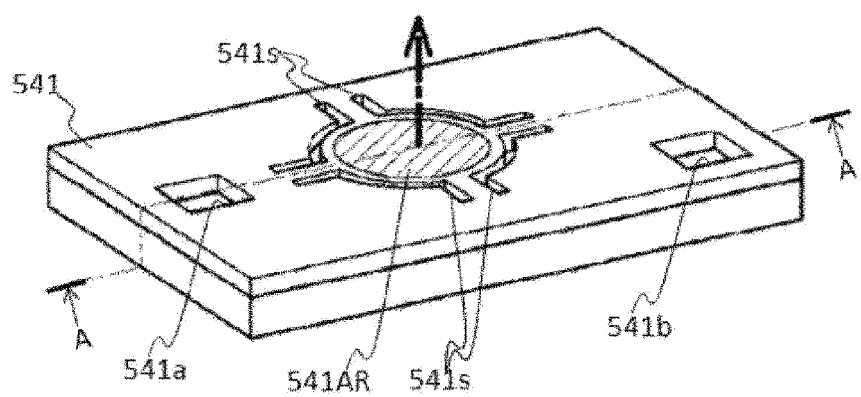

The configuration of the spectroscope 54 is explained in detail. FIGS. 4A and 4B are perspective views showing the external shape of the spectroscope 54. In FIG. 4A, the spectroscope 54 viewed from a light incident side is shown. In FIG. 4B, the spectroscope 54 viewed from a light emission side is shown. Arrows indicated by alternate long and short dash lines in the figures represent the direction of light made incident on the spectroscope 54 and the direction of light emitted from the spectroscope 54.

As shown in FIG. 4A, the spectroscope 54 mainly includes a first substrate 540 and a second substrate 541. The first substrate 540 and the second substrate 541 are integrated by being laid one on top of the other and stuck together.

The first substrate 540 and the second substrate 541 are formed of a silicon material (crystalline silicon or amorphous silicon), a glass material, or the like. The thickness of the first substrate 540 is about 2000 μm at most (representatively 100 to 1000 μm). The thickness of the second substrate 541 is about 500 μm at most (representatively 10 to 100 μm).

On the first substrate 540, a reflection preventing film 540AR is formed on a surface on the light incident side. The reflection preventing film 540AR is formed by, for example, a dielectric multilayer film. The reflection preventing film 540AR prevents light made incident on the spectroscope 54 from being reflected. Light is made incident on the inside of the spectroscope 54 from a light receiving section 540a (a portion surrounded by a thin broken line in FIG. 4A), which is a part of the surface on which the reflection preventing film 540AR is formed. In this embodiment, the end faces of the optical fibers for light reception 52A and 52B and the light receiving section 540a are provided to be opposed to each other such that lights emitted from the optical fibers for light reception 52A and 52B are made incident on the light receiving section 540a.

On the surface of the second substrate 541 (the rear side (the light emission side) of the spectroscope 54), as shown in FIG. 4B, a reflection preventing film 541AR is circularly formed in the center. Like the reflection preventing film 540AR of the first substrate 540, the reflection preventing film 541AR formed on the second substrate 541 is formed by, for example, a dielectric multilayer film. The reflection preventing film 541AR prevents light about to be emitted to the outside from the spectroscope 54 from being reflected on the surface of the second substrate 541 and returning to the inside of the spectroscope 54.

In the second substrate 541, thin slits 541s are formed to surround the reflection preventing film 541AR. The slits 541s pierce through the second substrate 541. In the second substrate 541, substantially rectangular extraction holes 541a and 541b are formed.

Figure 5:
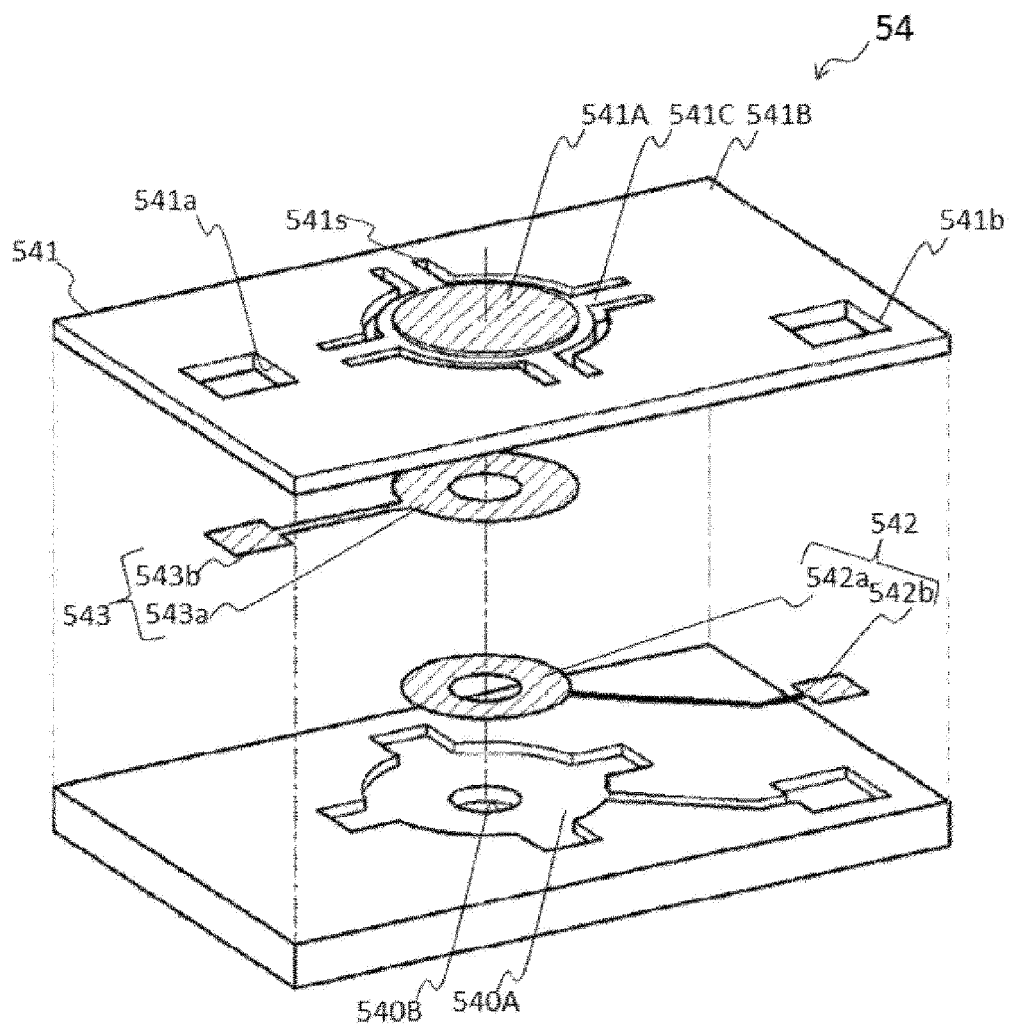
FIG. 5 is a diagram showing an example of the configuration of the spectroscope.

FIG. 5 is an exploded view showing the structure of the spectroscope 54. The surface on the light incident side (the first substrate 540) of the spectroscope 54 is a mere plane. However, the inner side (a side facing the second substrate 541) of the first substrate 540 has a complicated shape. Therefore, to clearly show the shape on the inner side of the first substrate 540, in FIG. 5, an exploded view in a state in which the spectroscope 54 is reversed (a state in which the second substrate 541 is placed on the first substrate 540 as shown in FIG. 4B) is shown.

The second substrate 541 is divided into a circular movable section 541A (a portion where the reflection preventing film 541AR is formed) in the center, a peripheral section 541B on the outer side of the movable section 541A, and a plurality of (in the example shown in the figure, four) connecting sections 541C that connect the movable section 541A and the peripheral section 541B.

A second electrode 543 is stuck to the surface on the inner side (a side facing the first substrate 540) of the second substrate 541. The second electrode 543 is formed by a metal foil having thickness of about 0.1 to 5 μm. The second electrode 543 includes an annular driving electrode section 543a and an extraction electrode section 543b extending from the driving electrode section 543a. The second electrode 543 is aligned with the second substrate 541 such that the annular driving electrode section 543a is concentric with the movable section 541A of the second substrate 541 and the end of the extraction electrode 543b is preset in the position of the extraction hole 541a of the second substrate 541.

A first recess 540A is formed on the surface on the inner side (a side facing the second substrate 541) of the first substrate 540. A circular second recess 540B is formed in the center of the first recess 540A. The shape of the first recess 540A is roughly a shape corresponding to the movable section 541A and the connecting sections 541C of the second substrate 541. The first recess 540A is extended to apart corresponding to the extraction hole 541b of the second substrate 541. The light receiving section 540a (see FIG. 4A) corresponds to a portion of the bottom of the second recess 540B.

A first electrode 542 is stuck to the first recess 540A. Like the second electrode 543, the first electrode 542 is formed by a metal foil having thickness of about 0.1 to 5 μm. Like the second electrode 543, the first electrode 542 includes an annular driving electrode section 542a and an extraction electrode section 542b extending from the driving electrode section 542a. The first electrode 542 is aligned such that the annular driving electrode section 542a is concentric with the circular second recess 540B.

Figure 6:
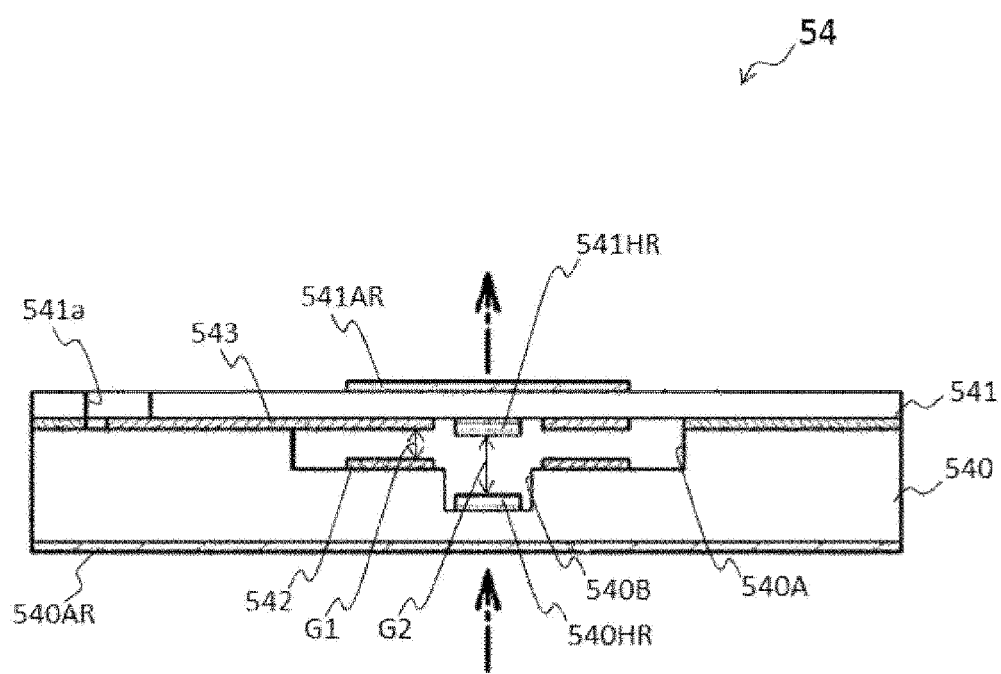
FIG. 6 is a diagram showing an example of the configuration of the spectroscope.

FIG. 6 is a sectional view in an A-A position in FIG. 4B. The second electrode 543 is provided on the second substrate 541. On the first substrate 540, the first electrode 542 is provided in the first recess 540A. Therefore, a gap G1 having substantially the same size as the depth of the first recess 540A is formed between the driving electrode section 543a of the second electrode 543 and the driving electrode section 542a of the first electrode 542.

On the bottom surface of the second recess 540B of the first substrate 540, a first reflection film 540HR formed by a dielectric multilayer film is formed. Further, on the second substrate 541, a second reflection film 541HR formed by a dielectric multilayer film is formed on the second substrate 541 to face the first reflection film 540HR. The first reflection film 540HR and the second reflection film 541HR have a function of reflecting light at high reflectance. Therefore, light made incident on the spectroscope 54 as indicated by an arrow of an alternate long and short dash line in the figure repeats reflection many times between the second reflection film 541HR and the first reflection film 540HR. A so-called Fabry-Perot interferometer is configured.

A gap G2 is formed between the first reflection film 540HR and the second reflection film 541HR. Light having a wavelength not satisfying an interference condition decided by a space of the gap G2 is suddenly attenuated on the surfaces of the second reflection film 541HR and the first reflection film 540HR by an interference of light. Only light satisfying the interference condition is emitted to the outside from the spectroscope 54.

The space of the gap G2 can be changed. The extraction electrode section 543b of the second electrode 543 is accessible from the extraction hole 541a formed on the second substrate 541. The extraction electrode section 542b of the first electrode 542 is accessible from the extraction hole 541b of the second substrate 541 (see FIG. 5).

When voltages of the same polarity are applied to the second electrode 543 and the first electrode 542 from the extraction holes 541a and 542b, it is possible to charge the driving electrode section 543a of the second electrode 543 and the driving electrode section 542a of the first electrode 542 in the same polarity and cause the driving electrode section 543a and the driving electrode section 542a to generate repulsive forces each other.

The driving electrode section 543a of the second electrode 543 is provided in the movable section 541A of the second substrate 541. The movable section 541A of the second substrate 541 is simply supported from the peripheral section 541B by the elongated connecting sections 541C. The driving electrode section 543a of the second electrode 543 and the driving electrode section 542a of the first electrode 542 are opposed to each other. Therefore, when a repulsive force acts between the driving electrode section 543a of the second electrode 543 and the driving electrode section 542a of the first electrode 542, the connecting sections 541C are deformed and the gap G1 expands. As a result, the gap G2 also expands. Since a repulsive force increases when an applied voltage is increased, the gap G2 is further expanded.

When the driving electrode section 543a of the second electrode 543 and the driving electrode section 542a of the first electrode 542 are charged in opposite polarities, an attraction force is generated. As a result, it is possible to reduce the gap G2.

By changing the space of the gap G2, it is possible to change the interference condition between the second reflection film 541HR and the first reflection film 540HR and emit only a wavelength satisfying the interference condition from the spectroscope 54. The light measuring device 50 detects, with the light receiving unit 55, the intensity of the light emitted from the spectroscope 54 in this way to thereby detect data of light intensities in respective wavelengths, that is, a relation (a spectrum) between the wavelengths and the light intensities.

Figure 7:
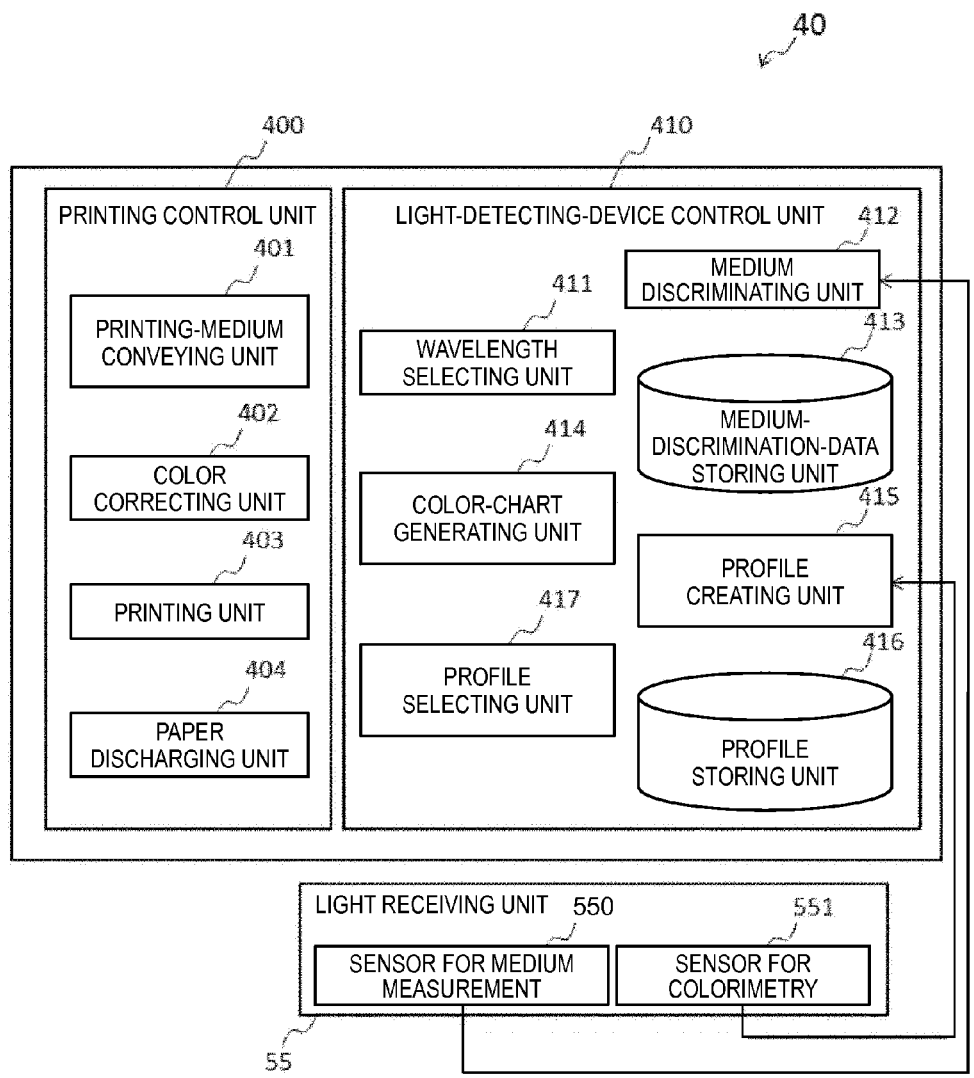
FIG. 7 is a block diagram showing an example of the functional configuration of a control unit.

FIG. 7 is a block diagram showing the electrical configuration of the control unit 40. The control unit 40 mainly includes a printing control unit 400 and a light-measuring-device control unit 410. The printing control unit 400 mainly includes a printing-medium conveying unit 401, a color correcting unit 402, a printing unit 403, and a paper discharge unit 404.

The printing-medium conveying unit 401 controls the rotation of the conveying mechanism, for example, the LD roller 22 and the PF roller 25 and performs control for conveying the printing medium 100 placed on the paper feeding tray 13 to the printing region.

The color correcting unit 402 applies, on the basis of a profile acquired from the light-measuring-device control unit 410, predetermined image processing to image data of an image about to be printed and determines a jetting amount of the ink on the basis of a result of the image processing. The color correcting unit 402 does not perform correction concerning a color chart (explained below) and performs color correction only for image data on the basis of a profile (explained below). The color correcting unit 402 outputs the color chart and image data after color correction to the printing unit 403. The color correcting unit 402 is equivalent to the output unit according to the invention.

The printing unit 403 controls the ink ejecting mechanism to thereby print the image data output from the color correcting unit 402 on the printing medium 100. The printing unit 403 is equivalent to the output unit according to the invention.

The paper discharge unit 404 controls the rotation of the conveying mechanism, for example, the paper discharge roller 27 and performs control for conveying the printing medium 100 from the printing region to the discharge port 12.

Since processing by the printing-medium conveying unit 401, the color correcting unit 402, the printing unit 403, and the discharge unit 404 are already publicly known, detailed explanation of the processing is omitted.

The light-measuring-device control unit 410 mainly includes a wavelength selecting unit 411, a medium discriminating unit 412, a medium-discrimination-data storing unit 413, a color-chart generating unit 414, a profile creating unit 415, a profile storing unit 416, and a profile selecting unit 417.

The wavelength selecting unit 411 switches a voltage applied to the first electrode 542 and the second electrode 543 and selects a wavelength of light detected by the light receiving unit 55. When the voltage applied to the first electrode 542 and the second electrode 543 is switched, the gap G2 shown in FIG. 6 is changed and the wavelength of the light detected by the light receiving unit 55 is changed. The light emitted from the optical fiber for light reception 52A is detected by a sensor for medium measurement 550 in the light receiving unit 55. The light emitted from the optical fiber for light reception 52B is detected by a sensor for colorimetry 551 in the light receiving unit 55. The sensor for medium measurement 550 and the sensor for colorimetry 551 are respectively, for example, arbitrary pixels in the area sensor. The sensor for medium measurement 550 and the sensor for colorimetry 551 can simultaneously detect lights or can detect lights at different timings. The wavelength selecting unit 411 is equivalent to the wavelength selecting unit according to the invention.

The medium discriminating unit 412 discriminates, on the basis of the spectral reflectance of the printing medium 100, whether the printing medium 100 is anyone of storage media, data of which is stored in the medium-discrimination-data storing unit 413. As the spectral reflectance, spectral reflectance detected by the sensor for medium measurement 550 of the light receiving unit 55 is input. When it is discriminated that the printing medium 100 is not any one of the storage media, the data of which is stored in the medium-discrimination-data storing unit 413, the medium discriminating unit 412 stores the acquired spectral reflectance of the printing medium 100 in the medium-discrimination-data storing unit 413. Processing by the medium discriminating unit 412 is explained in detail below. The medium discriminating unit 412 and the sensor for medium measurement 550 are equivalent to the acquiring unit according to the invention. The medium discriminating unit 412 is equivalent to the printing-medium-information acquiring unit and the printing-medium discriminating unit according to the invention.

In the medium-discrimination-data storing unit 413, information (e.g., a name or an ID) specifying a printing medium and spectral reflectance (or may be a spectrum) are stored in association with each other with respect to a plurality of printing media.

When it is discriminated by the medium discriminating unit 412 that the printing medium 100 is not any one of the storage media, the data of which is stored in the medium-discrimination-data storing unit 413, the color-chart generating unit 414 generates a predetermined color chart and outputs the color chart to the color correcting unit 402.

A detection result of the sensor for colorimetry 551 of the light receiving unit 55 is input to the profile creating unit 415. The profile creating unit 415 creates, on the basis of the detection result, a color correction lookup table (hereinafter referred to as LUT) in which, for example, sRGB data and CMYKlclm data are associated with each other. The profile creating unit 415 stores the created color correction LUT in the profile storing unit 416. Processing by the profile creating unit 415 is explained in detail below. The profile creating unit 415 and the sensor for colorimetry 551 are equivalent to the acquiring unit according to the invention. The profile creating unit 415 is equivalent to the information creating unit according to the invention.

In this embodiment, in the color correction LUT, the sRGB data and the CMYKlclm data are associated with each other. However, data associated with the CMYKlclm data is not limited to sRGB data. For example, the data may be AdobeRGB or the like, which is an RGB input, may be sYCC, which is a luminance-color difference signal input, or may be Japan Color or the like, which is a CMYK input.

In the profile storing unit 416, concerning a printing medium, the spectral reflectance of which is stored in the medium-discrimination-data storing unit 413, information specifying the printing medium and the color correction LUT are stored in association with each other.

The profile selecting unit 417 acquires, from the profile storing unit 416, the color correction LUT corresponding to the printing medium discriminated by the medium discriminating unit 412 and outputs the color correction LUT to the color correcting unit 402.

Figure 8:
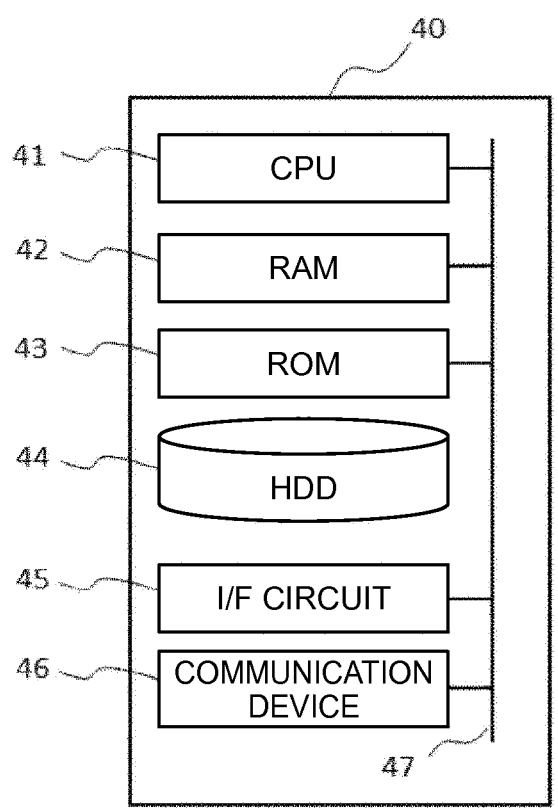
FIG. 8 is a diagram showing the hardware configuration of the control unit.

FIG. 8 is a block diagram showing an example of the schematic configuration of the control unit 40. As shown in the figure, the control unit 40 includes a CPU 41, which is an arithmetic unit, a RAM 42, which is a volatile storage device, a ROM 43, which is a nonvolatile storage device, a hard disk drive (HDD) 44, an interface (I/F) circuit 45 configured to connect the control unit 40 and other units, a communication device 46 configured to perform communication with an apparatus (e.g., a digital camera) on the outside of the printing apparatus 1, and a bus 47 configured to connect these devices to one another.

The functional units (excluding the medium-discrimination-data storing unit 413 and the profile storing unit 416, see FIG. 7) are realized by, for example, the CPU 41 reading out a predetermined computer program stored in the ROM 43 to the RAM 42 and executing the computer program. The medium-discrimination-data storing unit 413 and the profile storing unit 416 are realized by, for example, the RAM 42, the ROM 43, or the HDD 44. For example, the predetermined computer program may be installed in the ROM 43 in advance or may be downloaded from a network via the communication device 46 and installed or updated.

As the configuration of the printing apparatus 1, the main configuration is explained in explaining the characteristics of this embodiment. The configuration of the printing apparatus 1 is not limited to the configuration explained above. A configuration of a general printing apparatus is not excluded.

Characteristic processing by the printing apparatus 1 in this embodiment is explained.

Figure 9:
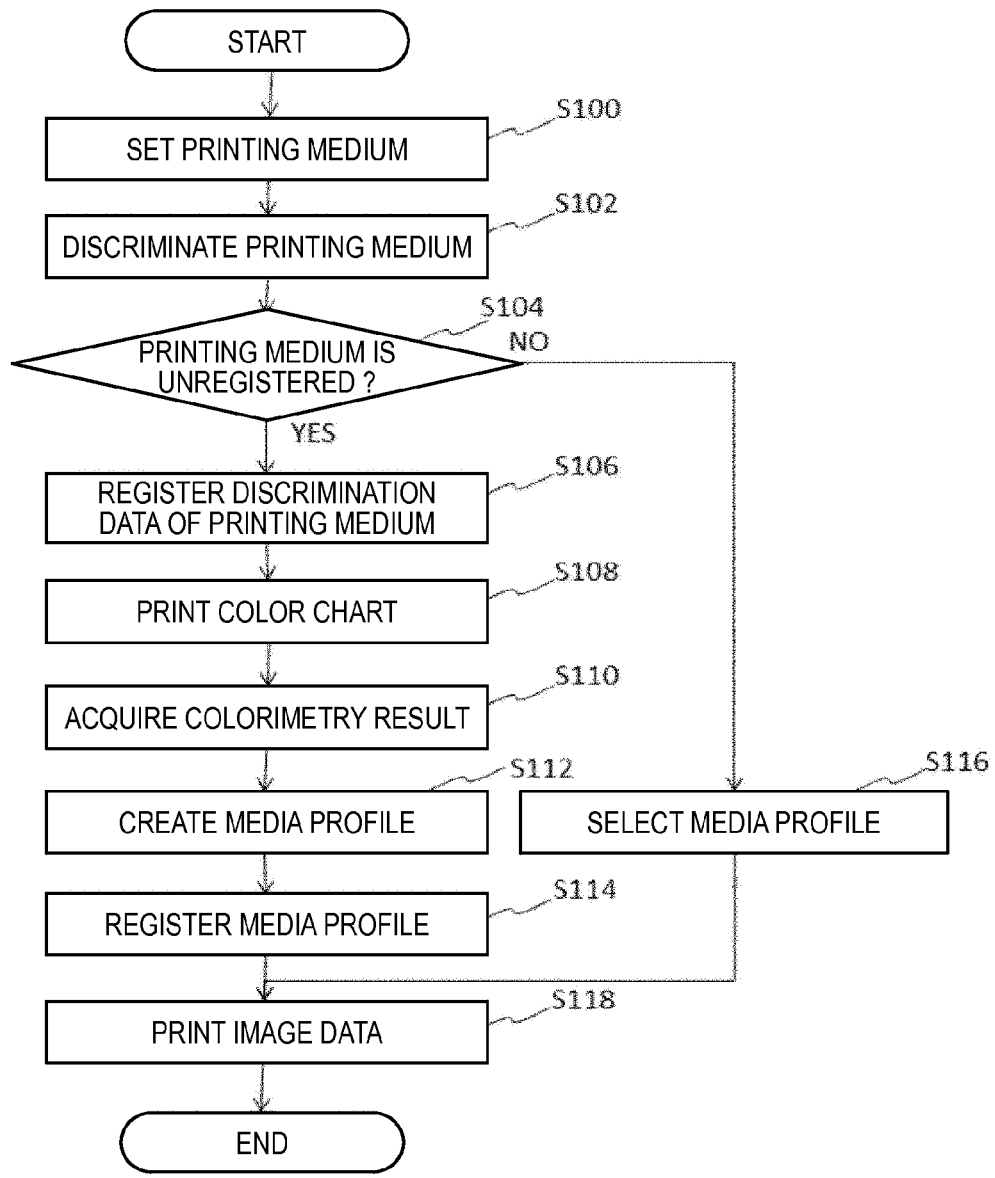
FIG. 9 is a flowchart for explaining a flow of processing by the printing apparatus.

FIG. 9 is a flowchart for explaining a flow of processing for discriminating the printing medium 100, performing color correction corresponding to the printing medium 100, and printing an image on the printing medium 100. This processing is performed when an instruction for a printing start is input by a button or the like.

The printing-medium conveying unit 401 detects, with a sensor (not shown in the figures) or the like, that the printing medium 100 is set in the paper feeding tray 13 (step S100). Then, the light-measuring-device control unit 410 performs printing medium discrimination processing (step S102).

Figure 10:
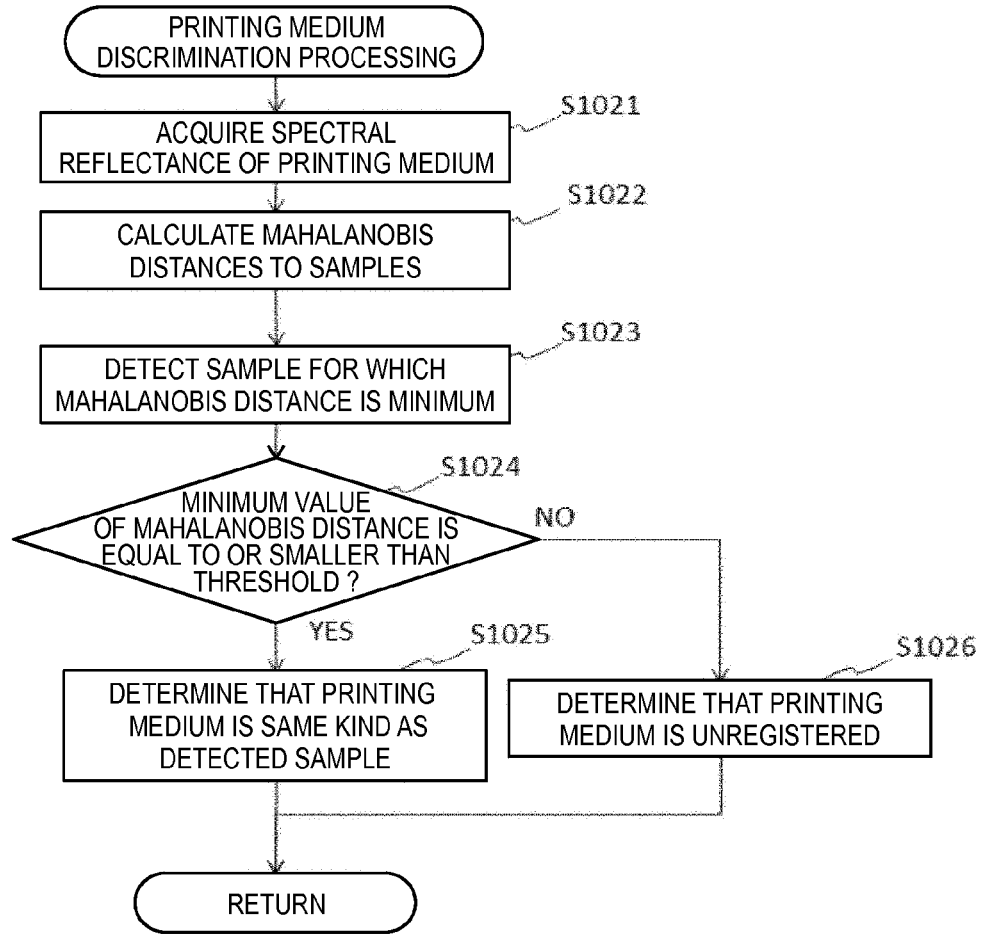
FIG. 10 is a flowchart for explaining a flow of printing medium discrimination processing by the printing apparatus.

FIG. 10 is a flowchart for explaining a flow of detailed processing by the printing medium discrimination processing (step S102). First, the medium discriminating unit 412 measures the spectral reflectance of the printing medium 100 using the light measuring device 50 (step S1021). Specifically, the medium discriminating unit 412 detects light intensity with the light receiving unit 55 while switching a voltage applied to the first electrode 542 and the second electrode 543 and changing the space of the gap G2. As a result, it is possible to measure spectral reflectance.

Figure 11:
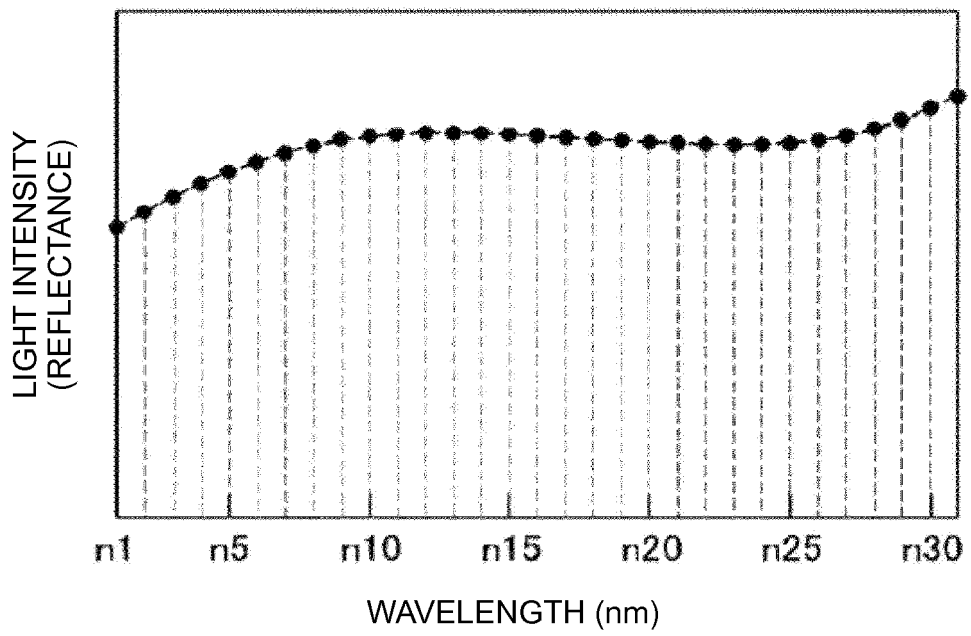
FIG. 11 is an example of spectral reflectance detected by the light measuring device.

FIG. 11 is a result obtained by measuring light intensities at a plurality of wavelengths in a certain wavelength range (e.g., 400 nm to 700 nm) at an interval of a predetermined wavelength width (e.g., 10 nm). It is possible to calculate reflectances (spectral reflectances) at the respective wavelengths by dividing the light intensities obtained at the wavelengths by intensities at the wavelengths included in irradiated light from the light source 53. That is, a spectrum and spectrum reflectance are the same in that the spectrum and the spectrum reflectance are information indicating a relation between a wavelength and light intensity.

In the example shown in FIG. 11, light intensities are measured at wavelengths of thirty-one points. However, the number of points of measurement is not limited to thirty-one and may be fewer than or more than thirty-one points. The reflectance is used because, whereas a numerical value of the light intensity changes according to the intensity of incident light, the reflectance is a value not depending on light source intensity and light receiving element sensitivity and this is convenient.

Referring back to FIG. 10, the medium discriminating unit 412 calculates Mahalanobis distances between the measured spectral reflectance and samples (step S1022). In this embodiment, a plurality of kinds of printing media are prepared as samples. Spectral reflectances concerning the samples are stored in the medium-discrimination-data storing unit 413 in advance. In step S1022, the medium discriminating unit 412 calculates Mahalanobis distances for all the samples.

The Mahalanobis distance is an index indicating, taking into account fluctuation of measurement values, to which group a sample is considered to belong. As possibility of belonging to a certain group is higher, the Mahalanobis distance for the group is smaller. When a measurement value is one-dimensional, it is possible to calculate the Mahalanobis distance (more accurately, a square value of the Mahalanobis distance) by raising a deviation between the measurement value and an average to the second power and dividing a value obtained by raising the deviation to the second power by dispersion. The Mahalanobis distance can also be expanded to multiple dimensions. Since the Mahalanobis distance and a method of calculating the Mahalanobis distance are already publicly known, detailed explanation thereof is omitted.

The medium discriminating unit 412 detects a sample for which the Mahalanobis distance calculated in step S1022 is a minimum value (step S1023). The medium discriminating unit 412 discriminates whether the minimum value of the Mahalanobis distance in step S1023 is equal to or smaller than a threshold (step S1024).

When the minimum value of the Mahalanobis distance is equal to or smaller than the threshold (YES in step S1024), the medium discriminating unit 412 determines that the printing medium 100 is the same type as the sample detected in step S1023 (step S1025).

When the minimum of the Mahalanobis distance is not equal to or smaller than the threshold (NO in step S1024), the medium discriminating unit 412 determines that data of the printing medium 100 is not stored in the medium-discrimination-data storing unit 413, that is, the printing medium 100 is unregistered (step S1026).

The medium discriminating unit 412 ends the printing medium discrimination processing (step S102).

Referring back to FIG. 9, the medium discriminating unit 412 determines, on the basis of a result in step S102, whether the printing medium 100 is unregistered (step S104).

When the printing medium 100 is unregistered (YES in step S104), the medium discriminating unit 412 stores, in the medium-discrimination-data storing unit 413, a detection result of the spectral reflectance detected by the sensor for medium measurement 550 (step S106).

The medium discriminating unit 412 issues an instruction to the color-chart generating unit 414. The color-chart generating unit 414 outputs data of a color chart to the printing control unit 400. As a result, the printing control unit 400 prints the color chart on the printing medium 100 (step S108). Concerning the color chart, color correction is not performed by the color correcting unit 402. Therefore, a color of the printed color chart is equivalent to printing by CMYKlclm data of a LUT without color correction. The LUT without color correction is a LUT in which ink amounts of colors are associated with lattice points in an RGB space. Specifically, in the LUT without color correction, orthogonal RGB lattice points (lattice points formed by combinations of values obtained by equally dividing gradation value regions equivalently assigned in respective axes to which color components of RGB are set as orthogonal axes) are defined. The orthogonal RGB lattice points are associated with ink amount lattice points (lattice points in an ink amount space formed by axes on which ink colors (in this embodiment, CMYKlclm) set as color components) selected by an arbitrary method of selection. Since an arbitrary ink amount can be converted into a color value (a Lab value, etc.), a correspondence relation between the RGB lattice points and the ink amount lattice points can be substantially considered a correspondence relation between the RGB lattice points and the color value.

In this embodiment, the LUT without color correction is created in advance and stored in the ROM 43 or the like. The LUT without color correction is created by creating an initial LUT, in which RGB lattice points and ink amount lattice points are associated with each other, created by a publicly-known method such as plate dividing work and applying, in a Lab space, smoothing processing to the ink amount lattice points in the initial LUT. A lattice point arrangement of colors indicated by CMYKlclm data defined in the initial LUT is smoothed in a Lab color space by the smoothing processing. A LUT with a high smoothing degree of the lattice point arrangement is created.

The wavelength selecting unit 411 controls the gap G2 such that at least light in a fixed wavelength region (e.g., 400 nm to 700 nm) is transmitted through the spectroscope 54 and detects the light transmitted through the spectroscope 54 using the sensor for colorimetry 551 (step S110). In this embodiment, since at least the light in the fixed wavelength region is transmitted through the spectroscope 54, the profile creating unit 415 calculates color values (XYZ, Lab values, etc.) from a measurement result in the sensor for colorimetry 551. Consequently, it is possible to sequentially subject patches on the chart to colorimetry and acquire Lab values of patches printed by RGB data specified in the LUT without color correction.

The profile creating unit 415 acquires a detection result of the detection in step S110 and creates, on the basis of the detection result, a color correction LUT in which sRGB data and CMYKlclm data are associated (step S112).

Specifically, the profile creating unit 415 carries out an interpolation operation referring to the Lab values of the patches and acquires RGB data corresponding to Lab values of colors indicated by the sRGB data.

The printing by the RGB data is equivalent to printing by the CMYKlclm data specified in the LUT without color correction. The result obtained in step S110 is Lab values of patches printed by the RGB data specified in the LUT without color correction.

Further, sRGB data serving as reference points registered in the color correction LUT is determined in advance (in this embodiment, the sRGB data is referred to as target). Since Lab values corresponding to the sRGB data can be acquired by a publicly-known expression, Lab values corresponding to the target can be easily acquired. If it is possible to grasp what kind of a value in an RGB colorimetric system specified in the LUT without color correction a color indicated by the sRGB data is, it is possible to associate the sRGB data and the CMYKlclm data and create the color correction LUT by converting the sRGB data into the CMYKlclm data referring to the LUT without color correction. Therefore, the interpolation operation is carried out with reference to the Lab values of the patches printed by the RGB data specified in the LUT without color correction to acquire RGB data corresponding to the Lab values of the color indicated by the sRGB data.

CMYKlclm data corresponding to the RGB data is acquired with reference to the LUT without color correction. Since the RGB data corresponds to the Lab values (equivalent to an ink amount) of the color indicated by the sRGB data, a color indicated by the CMYKlclm data coincides with the color indicated by the sRGB data. Therefore, it is possible to create a color correction LUT by creating a table in which the sRGB data and the CMYKlclm data are associated with each other. That is, the color correction LUT is information specifying a relation between a color value after color correction and an ink amount.

In this embodiment, gamut mapping is performed before the Lab values of the target and the RGB data of the LUT without color correction are associated. That is, the size of a color gamut of a color that can be expressed by the sRGB data and the size of a color gamut of a color that can be expressed by the RGB data specified in the LUT without color correction are different. Therefore, color gamut compression is performed to make the sizes coincide with each other.

Consequently, a color correction LUT is created. The profile creating unit 415 stores the created color correction LUT in the profile storing unit 416 (step S114).

Not only a media profile stored in the profile storing unit 416 anew in step S114 but also a media profile stored in the profile storing unit 416 in advance is created by the flow in steps S108 to S112.

The color correction LUT is different for each of printing medium. Therefore, the color correction LUT is hereinafter referred to as media profile.

When the printing medium 100 is not unregistered (NO in step S104), that is, when the data of the printing medium 100 is stored in the media-discrimination-data storing unit 413, the media discriminating unit 412 outputs information concerning the discriminated printing medium 100 (information that can specify a type of the printing medium such as a name or an ID of the printing medium) to the profile selecting unit 417. The profile selecting unit 417 acquires, on the basis of the acquired information concerning the printing medium 100, a media profile of the printing medium 100 discriminated by the medium discriminating unit 412 from the profile storing unit 416 (step S116).

When a media profile is stored in the profile storing unit 416 anew in step S114, the profile selecting unit 417 outputs the stored media profile to the color correcting unit 402. When a media profile is acquired from the profile storing unit 416 in step S116, the profile selecting unit 417 outputs the acquired media profile to the color correcting unit 402. The color correcting unit 402 corrects image data, that is, an ink amount on the basis of the media profile output from the profile selecting unit 417. The printing unit 403 ejects the ink to the printing medium 100 from the ink ejection nozzles 35 on the basis of the image data corrected by the color correcting unit 402, that is, performs printing (step S118). Consequently, an image is printed on the printing medium 100 in an appropriate color corresponding to the printing medium 100.

According to this embodiment, a plurality of lights guided from different places such as a setting place of the printing medium 100 and a printing place of the printing medium 100 can be detected by one light measuring device. Since the plurality of lights are made incident on one spectroscope, the plurality of lights can be measured in one place. Therefore, it is possible to reduce a space for the light measuring device and provide the light measuring device on the inside of a printing apparatus.

According to this embodiment, a type of a printing medium is discriminated by the light measuring device and color correction corresponding to the printing medium is performed. Therefore, it is possible to print a fixed color irrespective of the printing medium.

According to this embodiment, since a type of a printing medium is discriminated by the light measuring device, paper setting with a printer driver is unnecessary.

According to this embodiment, it is possible to adjust an ink amount discharged to the printing medium, that is, a color after printing by creating a profile specifying a relation between a color value and an ink amount.

In this embodiment, the set of optical fibers (the optical fiber for light source and the optical fiber for light reception) are provided in the setting place of the printing medium. However, in the case of a printing apparatus including a plurality of trays in which sheets are inserted like a digital printing machine, the set of optical fibers may be provided for each of the sheet trays.

In this embodiment, when the printing medium is unregistered (YES in step S104), the control unit 40 creates and registers a media profile (step S108 to S114). However, when the printing medium is unregistered, the control unit 40 may notify a user that the printing medium is unregistered without creating or registering a media profile.

In this embodiment, the area sensor in which the plurality of sensors are two-dimensionally arranged is used as the light receiving unit 55. However, the light receiving unit 55 is not limited to the area sensor and may be any sensor as long as the sensor generates a signal according to the intensity of received light. For example, single photosensors may be respectively arranged in positions where lights emitted from the optical fibers for light reception 52A and 52B are emitted from the spectroscope 54. However, when the area sensor is used, it is possible to expand alight receiving area according to the area of light passed through the spectroscope 54 and increase measurement sensitivity.

In this embodiment, the optical fiber for light source 51B and the optical fiber for light reception 52B are moved in the left right direction (the main scanning direction) to perform the colorimetry of the printed color chart. However, a form is also conceivable in which the optical fiber for light source 51B and the optical fiber for light reception 52B are not moved in the left right direction (the main scanning direction). For example, the color chart may be printed at an end of the printing medium 100 (e.g., outside a used region) along the sub-scanning direction. The optical fiber for light source 51B and the optical fiber for light reception 52B may be provided in positions where the portion for printing the color chart can be subjected to the colorimetry.

In this embodiment, the control unit 40 is provided on the inside of the printing apparatus 1. The control unit includes the light-measuring-device control unit 410. However, the control unit 40 may include only the printing control unit 400. The light-measuring-device control unit 410 may be provided on the inside of the light measuring device 50.

In this embodiment, the light source 53 is provided on the inside of the light measuring device 50. However, the light source 53 may be provided outside of the light measuring device 50. The number of light sources is not limited to one.

In this embodiment, an inkjet printer is used as the printing apparatus 1. However, the printing apparatus 1 may be printers of other systems such as a laser printer.

Second Embodiment

In the first embodiment of the invention, the optical fibers for light source 51A and 51B and the optical fibers for light reception 52A and 52B are disposed in the place of the paper feeding tray 13 where the printing medium 100 is set and in the recording head 34 inside the printing apparatus 1. However, places where the optical fibers for light source 51A and 51B and the optical fibers for light reception 52A and 52B are disposed are not limited to these places.

A second embodiment of the invention is a form in which optical fibers for light source and optical fibers for light reception are disposed in a plurality of places of the recording head 34. A printing apparatus 2 in the second embodiment is explained below. Components same as the components in the first embodiment are denoted by the same reference numerals and signs and explanation of the components is omitted.

Figure 12:
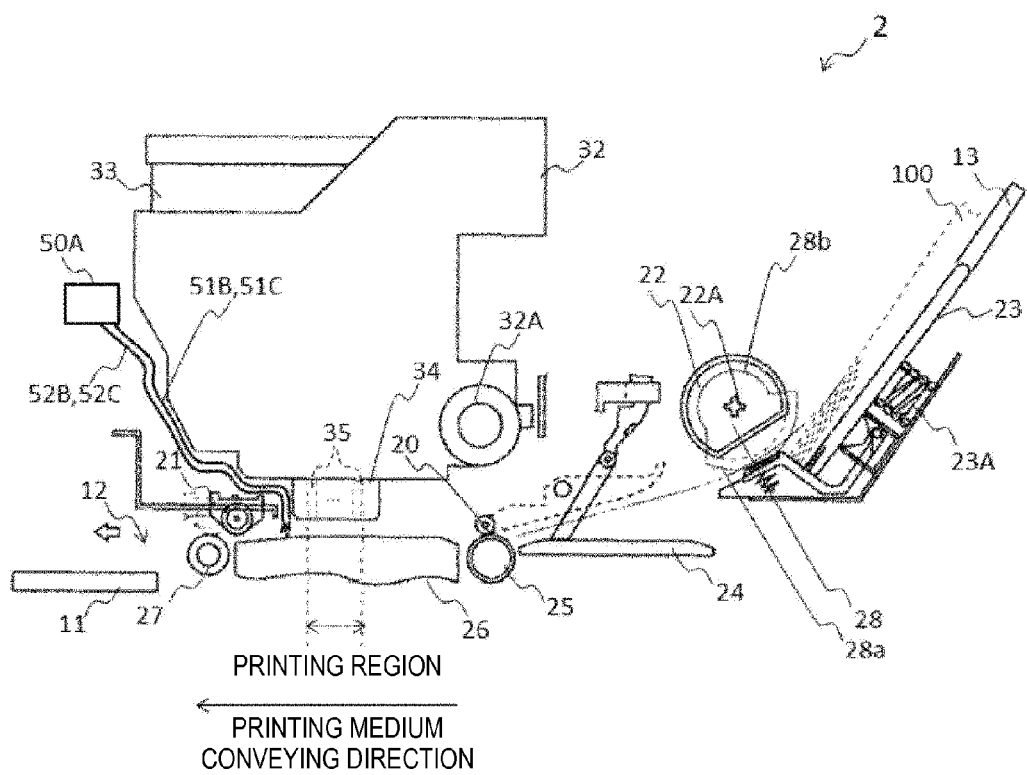
FIG. 12 is a diagram showing an example of the configurations of a conveying mechanism and an ink ejecting mechanism of a printing apparatus in a second embodiment.

FIG. 12 is a diagram showing an example of the configurations of a conveying mechanism and an ink ejecting mechanism of the printing apparatus 2 in the second embodiment of the invention.

In the printing apparatus 2, optical fibers for light source 51B and 51C and optical fibers for light reception 52B and 52C are provided such that light reflected on the printing medium 100 passed below the recording head 34 can be detected. The optical fibers for light source 51B and 51C are provided side by side in the left right direction (a main scanning direction, a direction perpendicular to the paper surface of FIG. 12) at an arbitrary interval. The optical fibers for light reception 52B and 52C are also provided side by side in the left right direction at an arbitrary interval.

The optical fibers for light source 51B and 51C, one ends of which are connected to the light source 53 (not shown in FIG. 12), and the optical fibers for light reception 52B and 52C, which receive lights respectively emitted from the optical fibers for light source 51B and 51C, are connected to a light measuring device 50A.

The optical fibers for light reception 52B and 52C acquire lights respectively emitted from the optical fibers for light source 51B and 51C and reflected on the printing medium 100 and guide the lights to the light measuring device 50A. The optical fibers for light reception 52B and 52C are provided in positions where lights emitted from the end faces of the optical fibers for light source 51B and 51C and reflected on the printing medium 100 are made incident on the end face of the optical fibers for light reception 52B and 52C.

In this embodiment, the optical fibers for light source 51B and 51C and the optical fibers for light reception 52B and 52C are provided further on the downstream side in a conveying direction than the recording head 34. However, the optical fibers for light source 51B and 51C and the optical fibers for light reception 52B and 52C are not limited to this form. As in the first embodiment, the optical fibers for light source 51B and 51C and the optical fibers for light reception 52B and 52C may be provided in any positions as long as lights can be irradiated on the printing medium 100 after image printing and lights reflected on the printing medium 100 can be acquired.

Figure 13:
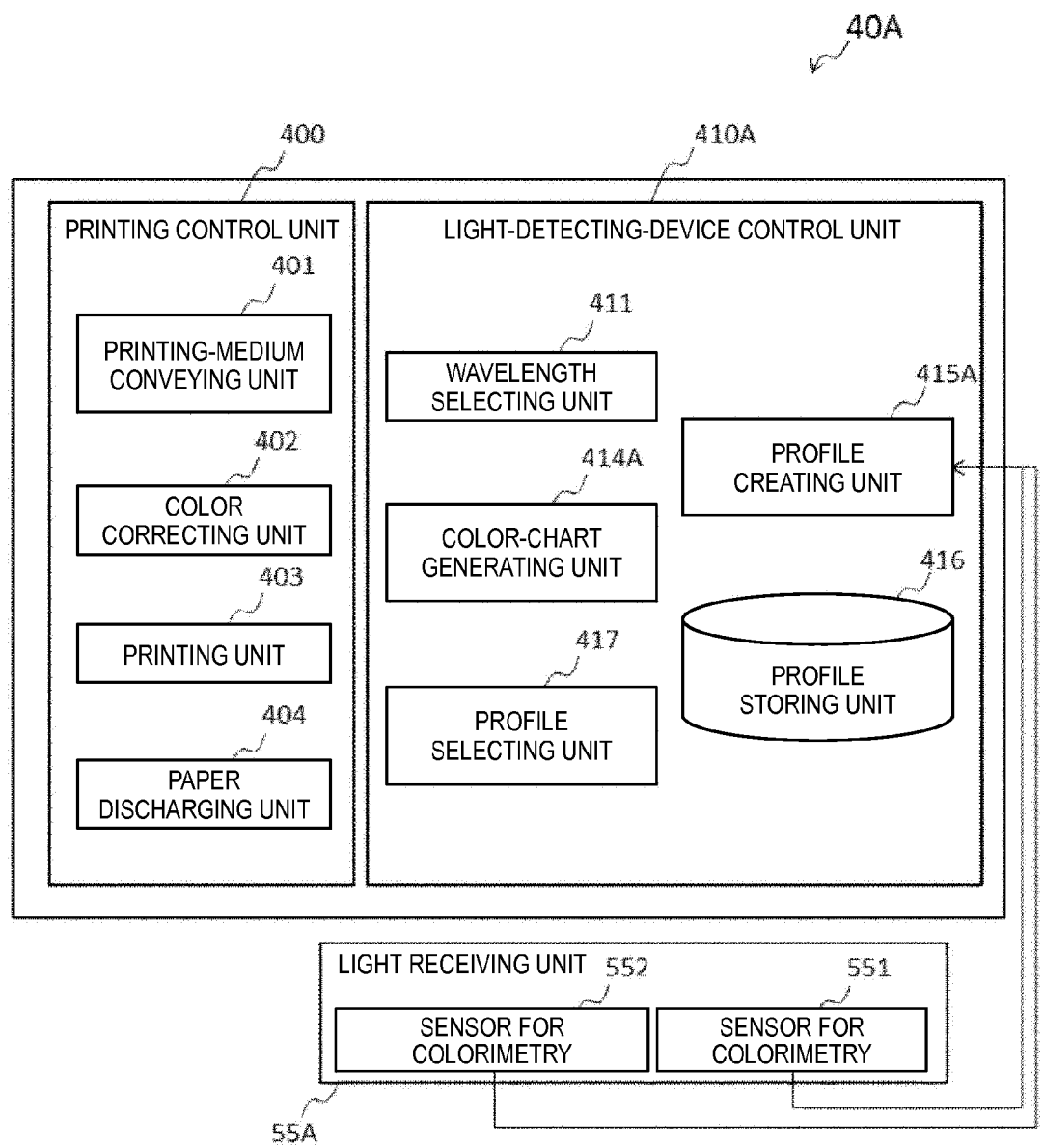
FIG. 13 is a block diagram showing an example of the functional configuration of a control unit.

FIG. 13 is a block diagram showing the electrical configuration of a control unit 40A. The control unit 40A mainly includes the printing control unit 400 and a light-measuring-device control unit 410A.

The light-measuring-device control unit 410A mainly includes the wavelength selecting unit 411, a color-chart generating unit 414A, a profile creating unit 415A, the profile storing unit 416, and the profile selecting unit 417.

The color-chart generating unit 414A generates a predetermined color chart and outputs the color chart to the color correcting unit 402.

The profile-creating unit 415A creates, on the basis of detection results of detection in the sensors for colorimetry 551 and 552 of the light receiving unit 55A, a color correction LUT (equivalent to the correction information) in which sRGB data and CMYKlclm data are associated with each other. As in the first embodiment, data associated with the CMYKlclm data of the color correction LUT is not limited to the sRGB data.

In this embodiment, lights are simultaneously detected by the two sensors for colorimetry 551 and 552. A positional relation on the printing medium 100 of the lights detected by the sensors for colorimetry 551 and 552, that is, a positional relation between the optical fibers for light source 51B and 51C and the optical fibers for light reception 52B and 52C and the recording head 34 and a positional relation between the recording head 34 and the printing medium 100 are recorded in the ROM 43 or the like. The profile creating unit 415A can recognize, on the basis of the position of the recording head 34 (which can be acquired from the printing unit 403 or the like) and a positional relation between the sensors for colorimetry 551 and 552, a color of which portion of the color chart is detected.

Since the other processing by the profile creating unit 415A is the same as the processing by the profile creating unit 415, explanation of the processing is omitted. Since the hardware configuration of the control unit 40A is the same as the hardware configuration of the control unit 40, explanation of the hardware configuration is omitted.

Characteristic processing by the printing apparatus 2 in this embodiment is explained.

Figure 14:
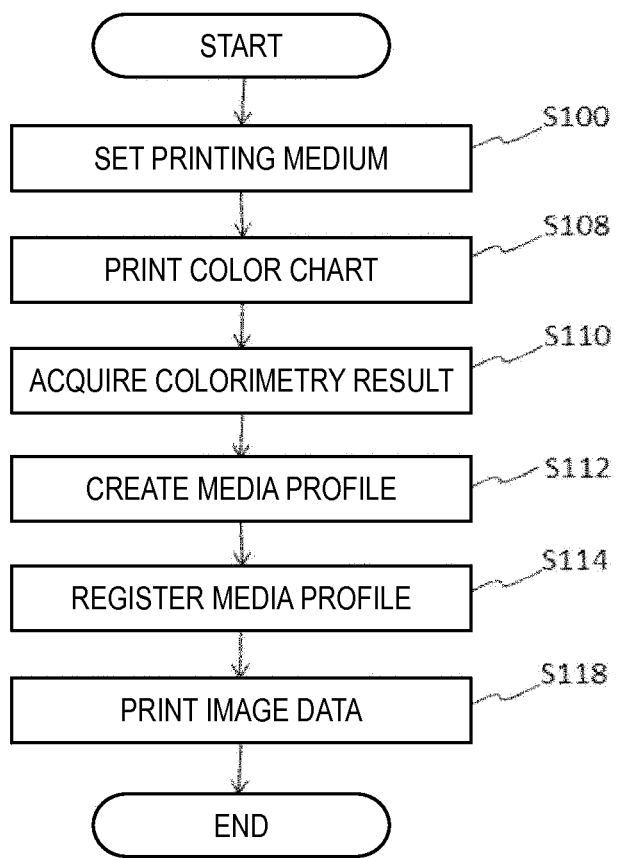
FIG. 14 is a flowchart for explaining a flow of processing by the printing apparatus.

FIG. 14 is a flowchart for explaining a flow of processing for performing color correction corresponding to the printing medium 100 and printing an image on the printing medium 100. The processing is performed when an instruction for a printing start is input by a button or the like.

The printing-medium conveying unit 401 detects, with a sensor or the like (not shown in the figures), that the printing medium 100 is set in the paper feeding tray 13 (step S100).

The color-chart generating unit 414A outputs data of the color chart to the printing control unit 400. As a result, the printing control unit 400 prints the color chart on the printing medium 100 (step S108).

The wavelength selecting unit 411 controls the gap G2 on the basis of information concerning RGB lattice points in the color chart such that a color printed on the printing medium 100 is transmitted through the spectroscope 54 and detects light transmitted through the spectroscope 54 using the sensor for colorimetry 551 (step S110). Consequently, it is possible to sequentially subject patches on the chart to colorimetry and acquire Lab values of patches printed by RGB data specified in the LUT without color correction.

The profile creating unit 415A acquires a detection result detected in step S110 and creates, on the basis of the detection result, a color correction LUT in which sRGB data and CMYKlclm data are associated (step S112).

The profile creating unit 415A stores the created color correction LUT in the profile storing unit 416 (step S114). The profile selecting unit 417 outputs a media profile stored in the profile storing unit 416 to the color correcting unit 402. The color correcting unit 402 corrects image data on the basis of the media profile output from the profile selecting unit 417. The printing unit 403 performs printing on the printing medium 100 on the basis of the image data corrected by the color correcting unit 402 (step S118).

According to this embodiment, it is possible to measure colors of different places of an image printed on a printing medium simultaneously and under the same condition. To create a media profile, it is necessary to subject about several hundred to several thousand colors to colorimetry. However, it is possible to create a media profile in a short time by subjecting colors in a plurality of places to the colorimetry simultaneously.

In this embodiment, to subject the colors in the plurality of places to the colorimetry simultaneously, it is possible to detect irregularity of a printing medium (color unevenness, irregularity of surface treatment, etc.) by contriving a color chart. For example, it is assumed that the color-chart generating unit 414A outputs, to the printing control unit 400, a color chart for printing the same color in different positions of the printing medium 100. When there is no irregularity in the printing medium 100, the same color is detected by the sensors for colorimetry 551 and 552. However, when there is irregularity in the printing medium 100 in the places where the same color is printed, the same color is not detected by the sensors for colorimetry 551 and 552 even if the same color is printed. Consequently, it is possible to detect irregularity of paper.

In this embodiment, since only one spectroscope is provided, unlike detection by a plurality of spectroscopes set under the same condition, it is possible to detect light completely under the same condition. When different spectroscopes are used, even if all the spectroscopes are set under the same condition, conditions of all the spectroscopes cannot be set to the same condition because of individual differences or the like of the spectroscopes. When lights passed through the same spectroscope and passed through different filters are detected, the lights cannot be detected under the same condition because of the individual differences or the like of the filters. On the other hand, in this embodiment, since only one spectroscope is provided and light emitted from the spectroscope is directly detected without using a filter, it is possible to detect a plurality of lights under the same condition.

Third Embodiment

In the first embodiment of the invention, the optical fibers for light source 51A and 51B and the optical fibers for light reception 52A and 52B are disposed in the place of the paper feeding tray 13 where the printing medium 100 is set and in the recording head 34 inside the printing apparatus 1. However, places where the optical fibers for light source 51A and 51B and the optical fibers for light reception 52A and 52B are disposed are not limited to these places.

A third embodiment of the invention is a form in which a plurality of optical fibers for light source and a plurality of optical fibers for light reception are disposed in a place of the paper feeding tray 13 where the printing medium 100 is set. A printing apparatus 3 in the third embodiment is explained. Components same as the components in the first embodiment are denoted by the same reference numerals and signs and explanation of the components is omitted.

Figure 15A:
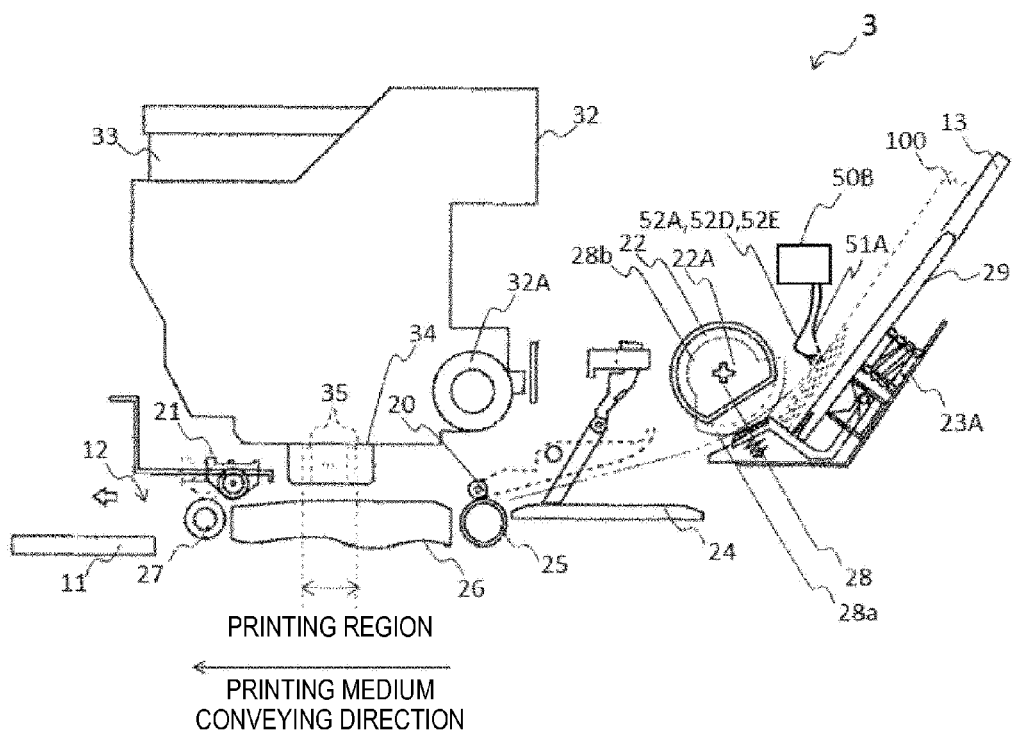
FIGS. 15A and 15B are diagrams showing an example of the configurations of a conveying mechanism and an ink ejecting mechanism of a printing apparatus in a third embodiment.
Figure 15B:
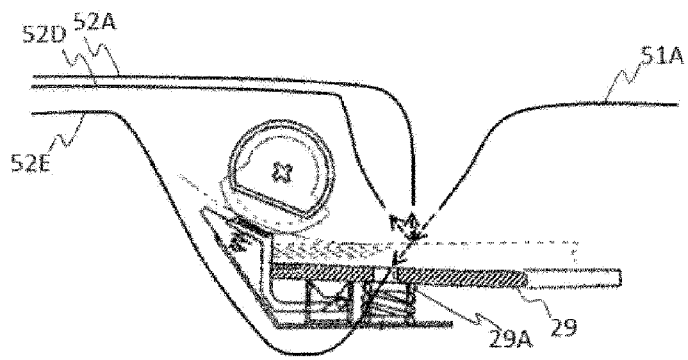

FIGS. 15A and 15B are diagrams showing an example of the configuration of the printing apparatus 3 in the third embodiment of the invention. FIG. 15A is a diagram showing an example of the configurations of a conveying mechanism and an ink ejecting mechanism of the printing apparatus 3. FIG. 15B is a partially enlarged view of a paper feeding portion (the LD roller 22 and a hopper 29) shown in FIG. 15A.

In the printing apparatus 3, a light measuring device 50B is provided such that light in a place of the paper feeding tray 13 where the printing medium 100 is set can be detected. Light emitted from the optical fiber for light source 51A is reflected on the printing medium 100, made incident on optical fibers for light reception 52A and 52D, and detected by the light measuring device 50B.

As shown in FIG. 15B, the optical fiber for light reception 52A is provided in a position where diffused reflected light irregularly reflected on the printing medium 100 is made incident. An optical fiber for light reception 52D is provided in a position where regularly reflected light regularly reflected on the printing medium 100 is made incident.

In this embodiment, not only reflected light but also transmitted light is detected. As shown in FIG. 15B, an optical fiber for light reception 52E is provided on the inside of a hole 29A formed in the hopper 29 such that transmitted light emitted from the optical fiber for light source 51A and transmitted through the printing medium 100 is made incident on the optical fiber for light reception 52E. The hopper 29 is the same as the hopper 23 other than the hole 29A.

It is possible to detect a color of the printing medium 100 by detecting the diffused reflected light. However, information concerning the thickness of the printing medium 100 cannot be accurately acquired only with the diffused reflected light. Therefore, in this embodiment, it is possible to more accurately acquire the information concerning the thickness of the printing medium 100 by detecting the transmitted light in addition to the diffused reflected light. Further, in this embodiment, it is possible to detect characteristics of the surface of the printing medium 100, for example, presence or absence of gloss by detecting the regularly reflected light. Consequently, it is possible to discriminate a type of the printing medium 100 more in detail.

Figure 16:
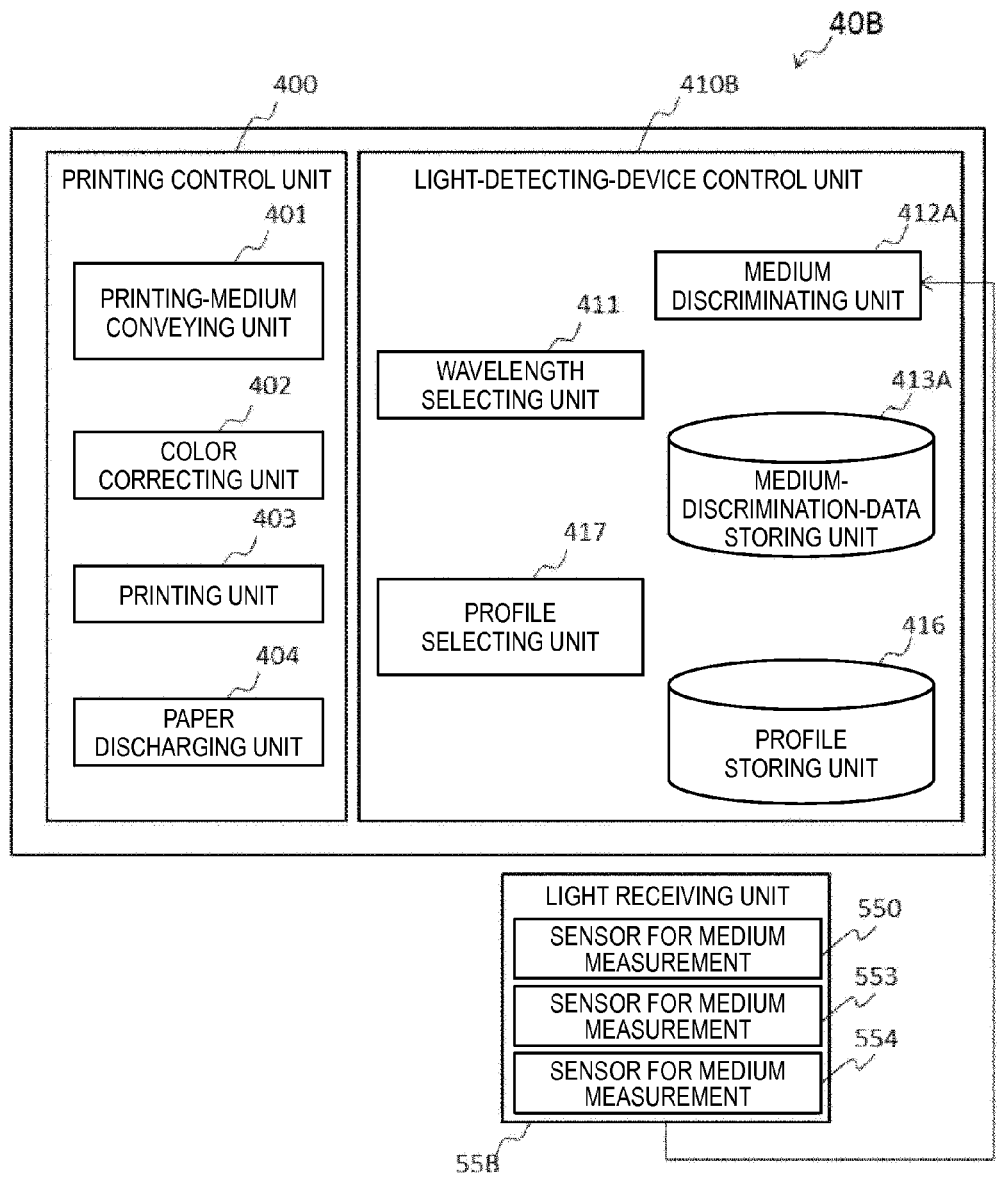
FIG. 16 is a block diagram showing an example of the functional configuration of a control unit.

FIG. 16 is a block diagram showing the electrical configuration of a control unit 40B. The control unit 40B mainly includes the printing control unit 400 and a light-measuring-device control unit 410B. The light-measuring-device control unit 410B mainly includes the wavelength selecting unit 411, a medium discriminating unit 412A, a medium-discrimination-data storing unit 413A, the profile storing unit 416, and the profile selecting unit 417.

The medium discriminating unit 412A discriminates, on the basis of spectral reflectances of diffused reflected light, regularly reflected light, and transmitted light of the printing medium 100, which of storage media, data of which is stored in the medium-discrimination-data storing unit 413A, the printing medium 100 is. As the spectral reflectance of the diffused reflected light, spectral reflectance of diffused reflected light detected by the sensor for medium measurement 550 of a light receiving unit 55B is input. As the spectral reflectance of the regularly reflected light, spectral reflectance of regularly reflected light detected by a sensor for medium measurement 553 of the light receiving unit 55B is input. As the spectral reflectance of the transmitted light, spectral reflectance of transmitted light detected by a sensor for medium measurement 554 of the light receiving unit 55B is input. Since the other processing by the medium discriminating unit 412A is the same as the processing by the medium discriminating unit 412, explanation of the processing is omitted.

In the medium-discrimination-data storing unit 413A, spectral reflectances of diffused reflected light, regularly reflected light, and transmitted light are stored in advance for each of a plurality of printing media.

Characteristic processing by the printing apparatus 3 in this embodiment is explained.

Figure 17:
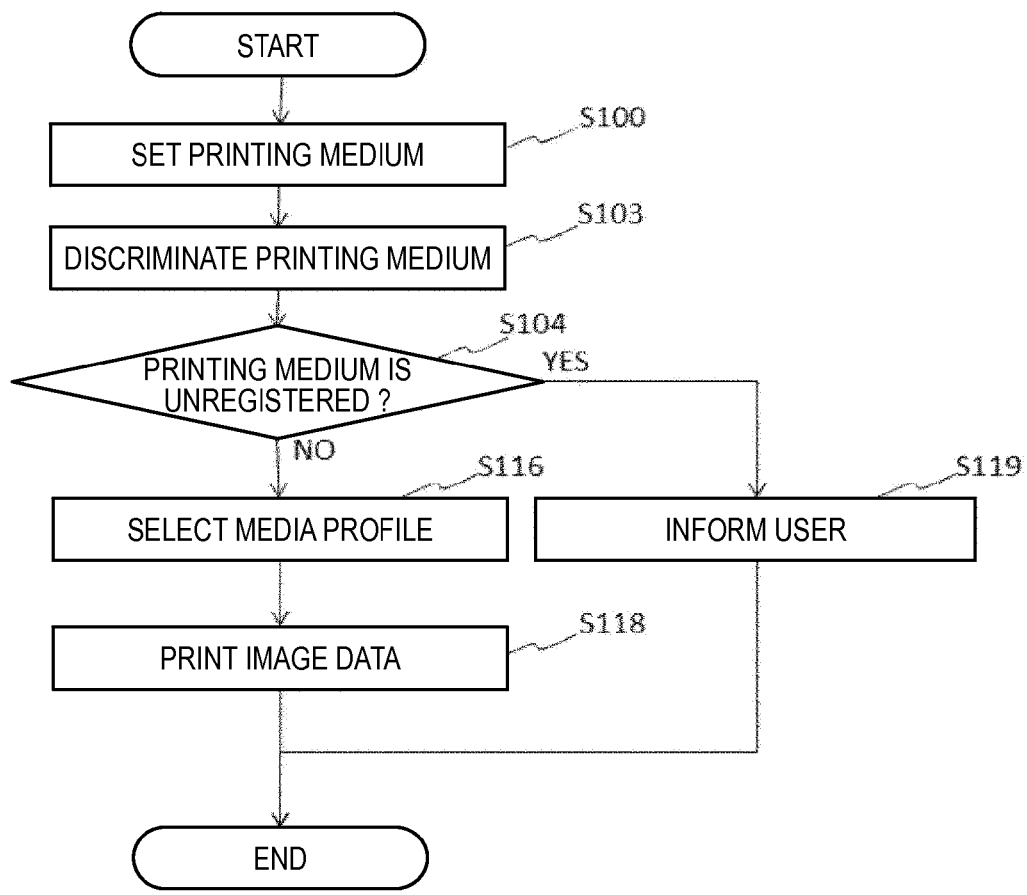
FIG. 17 is a flowchart for explaining a flow of processing by the printing apparatus.

FIG. 17 is a flowchart for explaining a flow of processing for discriminating the printing medium 100, performing color correction corresponding to the printing medium 100, and printing an image on the printing medium 100. The processing is performed when an instruction for a printing start is input by a button or the like.

The printing-medium conveying unit 401 detects, with a sensor (not shown in the figures) or the like, that the printing medium 100 is set in the paper feeding tray 13 (step S100). Then, the light-measuring-device control unit 410B performs printing medium discrimination processing (step S103).

In the printing medium discrimination processing (step S103), the light-measuring-device control unit 410B calculates, for samples, Mahalanobis distances between spectrum data of diffused reflected light, regularly reflected light, and transmitted light of the samples and acquired spectrum data of diffused reflected light, regularly reflected light, and transmitted light and detects a sample for which a sum of the Mahalanobis distances is minimum. A method of calculating Mahalanobis distances is not limited to this and may be other methods. For example, a method of collecting all spectrum data of diffused reflected light, regularly reflected light, and transmitted light (e.g., for thirty-one wavelengths for each of the spectrum data), treating the spectrum data as one data (e.g., ninety-three-dimensional data), and calculating Mahalanobis distances on a multi-dimensional space may be used.

The printing medium discrimination processing (step S103) and the printing medium discrimination processing (step S102) are different in that, whereas the printing medium discrimination processing (step S102) is performed on the basis of only diffused reflected light, the printing medium discrimination processing (step S103) is performed on the basis of diffused reflected light, regularly reflected light, and transmitted light. Since a flow of the printing medium discrimination processing (step S103) is the same as the flow of the printing medium discrimination processing (step S102), detailed explanation of the flow of the printing medium discrimination processing (step S103) is omitted.

The medium discriminating unit 412A determines, on the basis of a result of step S103, whether the printing medium 100 is unregistered (step S104).

When the printing medium 100 is not unregistered (NO in step S104), that is, when data of the printing medium 100 is stored in the medium-discrimination-data storing unit 413A, the medium discriminating unit 412A outputs information concerning the discriminated printing medium 100 (e.g., information that can specify a type of the printing medium such as a name or an ID of the printing medium) to the profile selecting unit 417. The profile selecting unit 417 acquires, on the basis of the acquired information concerning the printing medium 100, a media profile of the printing medium 100 discriminated by the medium discriminating unit 412A from the profile storing unit 416 (step S116).

The profile selecting unit 417 outputs the acquired media profile to the color correcting unit 402. The color correcting unit 402 corrects image data on the basis of the media profile output from the profile selecting unit 417. The printing unit 403 performs printing on the printing medium 100 on the basis of the image data corrected by the color correcting unit 402 (step S118).

When the printing medium 100 is unregistered (YES in step S104), the medium discriminating unit 412A informs, via a not-shown output device, a user that the printing medium 100 is unregistered (step S119). As the output device, an already publicly-known device such as a display device or a sound output device (e.g., a speaker) can be used.

According to this embodiment, it is possible to obtain many kinds of information such as surface unevenness and thickness of a printing medium by measuring regularly reflected light and transmitted light in addition to diffused reflected light. Therefore, it is possible to distinguish a very small difference of the printing medium and improve accuracy of type discrimination of the printing medium.

In this embodiment, it is possible to simultaneously detect diffused reflected light, regularly reflected light, and transmitted light using the same light measuring device. Therefore, it is possible to reduce time required for the detection.

Further, in this embodiment, diffused reflected light, regularly reflected light, and transmitted light are detected by the same spectroscope. Therefore, it is possible to detect, under the completely the same condition, three kinds of lights for obtaining information concerning a printing medium 100 and improve accuracy of type discrimination of the printing medium.

Fourth Embodiment

In the first embodiment of the invention, the light measuring device is disposed on the inside of the printing apparatus. However, a position where the light measuring device can be disposed is not limited to the inside of the printing apparatus.

A fourth embodiment of the invention is a form in which the light measuring device is disposed on the inside of a projector. A projector 4 in the fourth embodiment is explained below. Components same as the components in the first embodiment are denoted by the same reference numerals and signs and explanation of the components is omitted.

Figure 18:
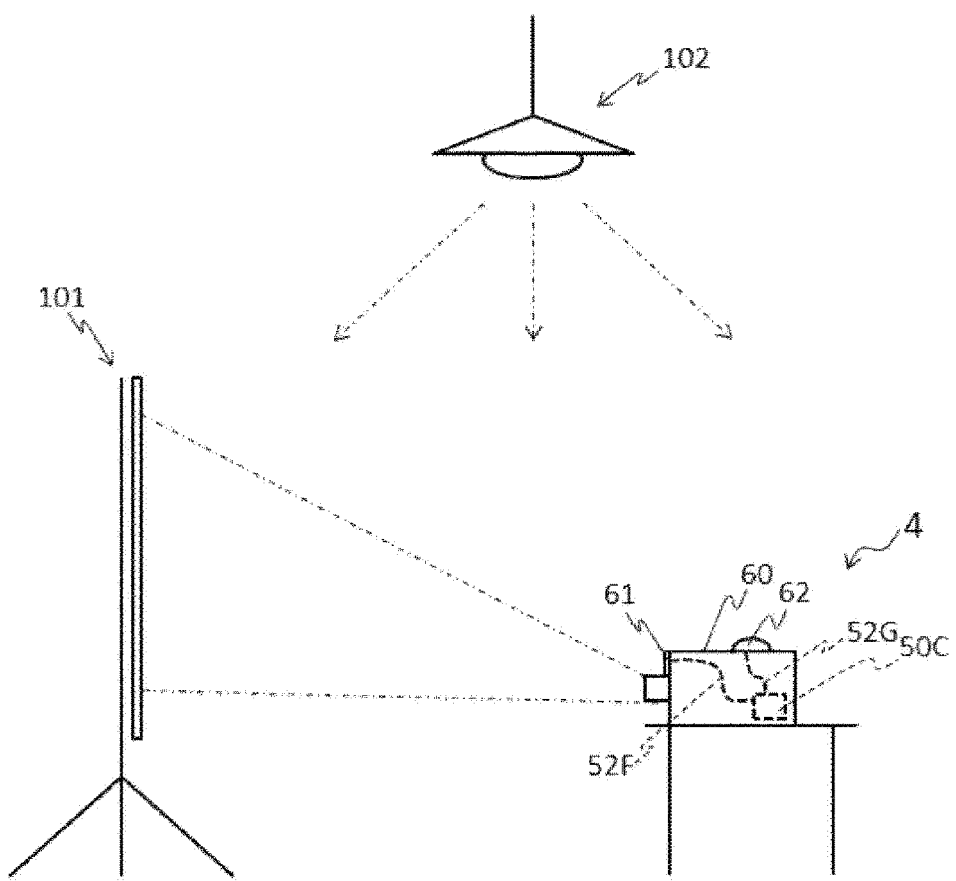
FIG. 18 is a diagram showing an example of the configuration of a projector in a fourth embodiment.

FIG. 18 is a diagram showing an example of the configuration of the projector 4 in the fourth embodiment of the invention. The projector 4 mainly includes a projector main body 60, a display-color measuring unit 61, and an illumination-light measuring unit 62. The projector 4 includes, on the inside, a control unit 40C (not shown in FIG. 18) and a light measuring device 50C.

The projector main body 60 projects a predetermined image on a screen 101 provided substantially in front of the projector main body 60. Since the configuration of the projector main body 60 is already publicly known, explanation of the configuration is omitted.

The display-color measuring unit 61 is provided on the front surface (a surface opposed to the screen 101) of the projector main body 60. Light reflected on the screen 101 is made incident on the display-color measuring unit 61. The light made incident on the display-color measuring unit 61 is made incident on the spectroscope 54 (not shown in FIG. 18) of the light measuring device 50C via an optical fiber for light reception 52F and received by a light receiving unit 55C. Consequently, a color of an image displayed on the screen 101 can be detected.

The illumination-light measuring unit 62 is provided on the upper surface of the projector main body 60. Light emitted by external lighting 102 is made incident on the illumination-light measuring unit 62 and received by the light receiving unit 55C. The light made incident on the illumination-light measuring unit 62 is made incident on the spectroscope 54 (not shown in FIG. 18) of the light measuring device 50C via an optical fiber for light reception 52G. Consequently, it is possible to discriminate a type of illumination light.

The optical fibers for light reception 52F and 52G are equivalent to the light guiding unit according to the invention.

A position where the illumination-light measuring unit 62 is disposed only has to be a position where light reflected on the screen 101 is not made incident and only light emitted by the external lighting 102 is made incident. The position is not limited to the upper surface of the projector main body 60.

Figure 19:
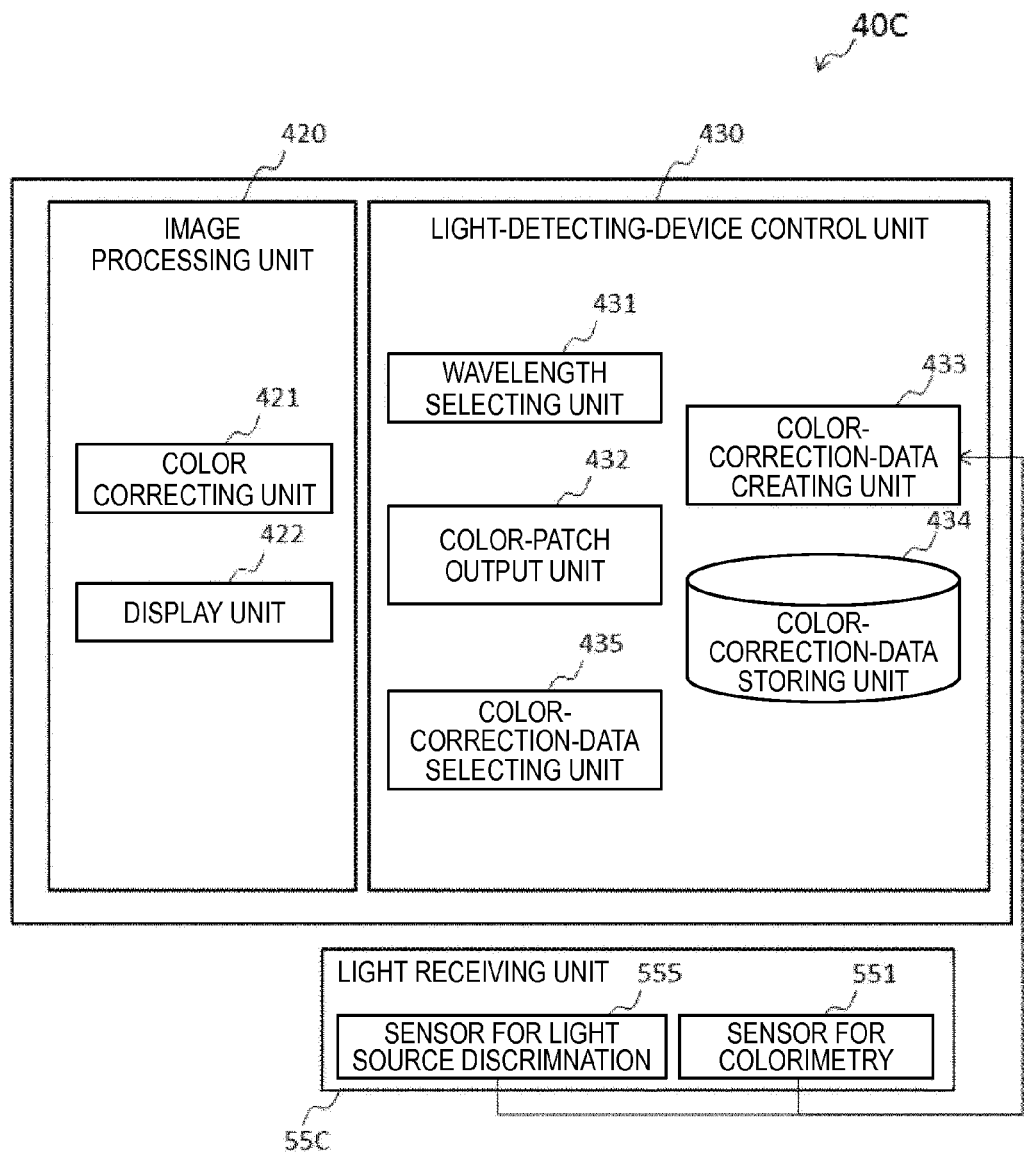
FIG. 19 is a block diagram showing an example of the functional configuration of a control unit.

FIG. 19 is a block diagram showing the electrical configuration of the control unit 40C. The control unit 40C mainly includes an image processing unit 420 and a light-measuring-device control unit 430.

The image processing unit 420 mainly includes a color correcting unit 421 and a display unit 422.

The color correcting unit 421 applies color correction to input image data using color correction data output from the light-measuring-device control unit 430. When an image input signal of an analog format is supplied from a personal computer or the like, the color correcting unit 421 converts the image input signal into a digital image signal and applies color correction to the digital image signal referring to a color correction table. The color correcting unit 421 is equivalent to the acquiring unit and the output unit according to the invention. The digital image signal subjected to the color correction is converted into an analog signal and output to the display unit 422.

The display unit 422 performs projection display of the image data output from the color correcting unit 421. The display unit 422 is equivalent to the output unit according to the invention.

The light-measuring-device control unit 430 mainly includes a wavelength selecting unit 431, a color-patch output unit 432, a color-correction-data creating unit 433, a color-correction-data storing unit 434, and a color-correction-data selecting unit 435. Since the wavelength selecting unit 431 is the same as the wavelength selecting unit 411, explanation of the wavelength selecting unit 431 is omitted.

The color-patch output unit 432 outputs color patches of colors R (red), G (green), B (blue), and BK (black) to the display unit 422. The color-patch output unit 432 is equivalent to the output unit according to the invention. The color patches are not limited to the four colors of R (red), G (green), B (blue), and BK (black). Colors other than the four colors may be added.

The color-correction-data creating unit 433 acquires a result obtained by detecting, with the sensor for colorimetry 551, light emitted from the optical fiber for light reception 52F and passed through the spectroscope 54. The color-correction-data creating unit 433 acquires a result (e.g., a luminance value and a spectrum) obtained by detecting, with a sensor for light source discrimination 555, light emitted from the optical fiber for light reception 52G and passed through the spectroscope 54. The color-correction-data creating unit 433 creates color correction data (first color correction data, second color correction data, and third color correction data; equivalent to the correction information) on the basis of the acquired detection results. Processing performed by the color-correction-data creating unit 433 is explained in detail below. The color-correction-data creating unit 433, the sensor for colorimetry 551, and the sensor for light source discrimination 555 are equivalent to the acquiring unit according to the invention. The color-correction-data creating unit 433 is equivalent to the information creating unit according to the invention.

The color correction data created by the color-correction-data creating unit 433 is stored in the color-correction-data storing unit 434.

The color-correction-data selecting unit 435 acquires the color correction data stored in the color-correction-data storing unit 434 and outputs the color correction data to the image processing unit 420.

Characteristic processing by the projector 4 in this embodiment is explained.

Figure 20:
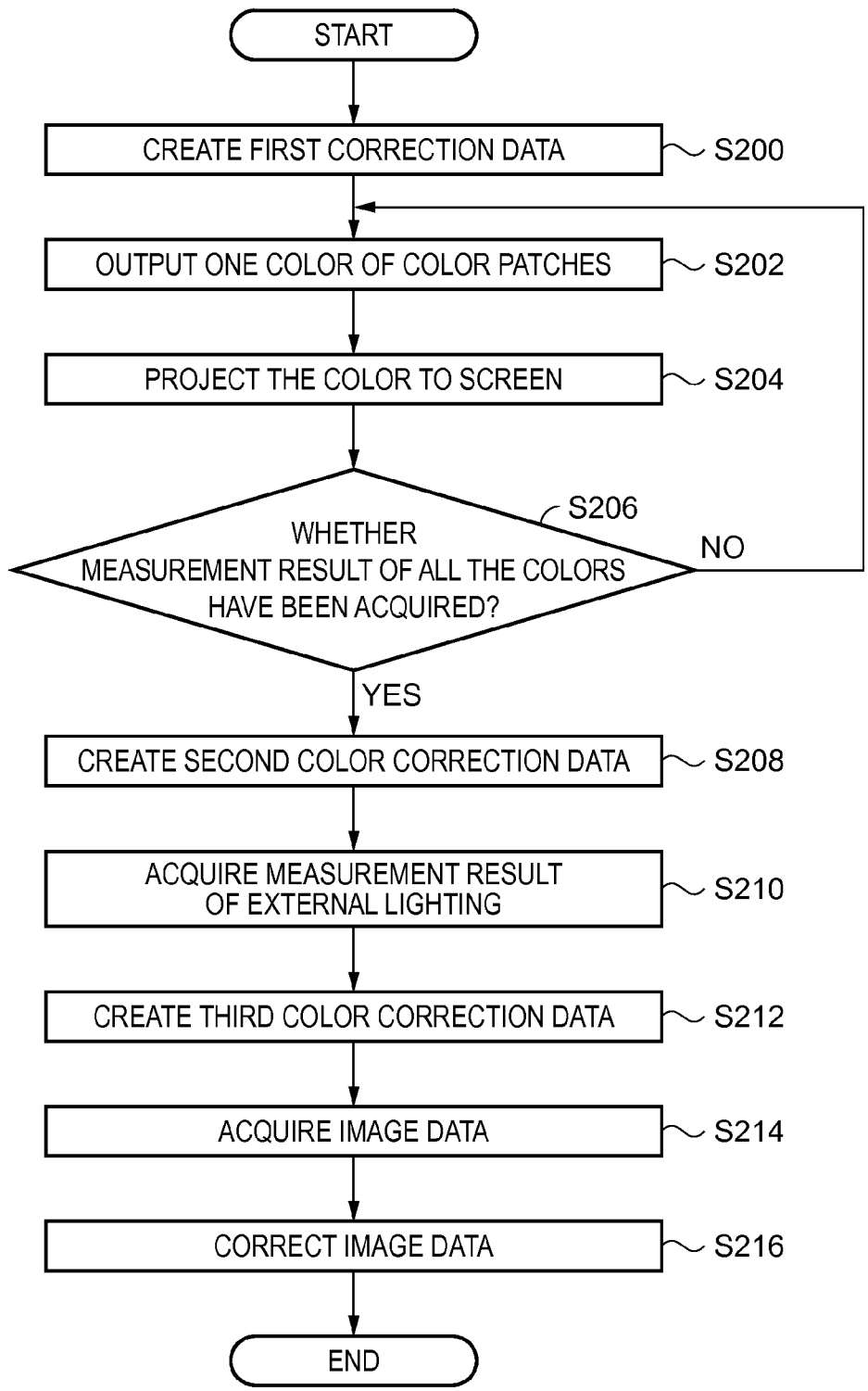
FIG. 20 is a flowchart for explaining a flow of processing by the projector.

FIG. 20 is a flowchart for explaining a flow of processing for performing color correction corresponding to the screen 101 and the external lighting 102 and projecting a projection image on the screen 101. The processing is performed when an instruction for a projection start is input by a button or the like.

Prior to the processing, the projector 4 is set to output white (R=G=B=255 gradations) in a darkroom and, with the light measuring device 50C, a luminance value of reflected light from the screen 101 is measured.

Also, prior to the processing, the projector 4 is set to output the colors of R (red), G (green), B (blue), and BK (black) on a reference projection surface in the darkroom and, with the light measuring device 50C, luminance values and spectrums of reflected lights of the color outputs reflected on the reference projection surface are measured. As the reference projection surface, for example, a projection surface, the reflectance of a visible light region of which is close to 1, of a standard diffuser or the like can be selected.

Further, prior to the processing, the projector 4 is set to output the colors of R (red), G (green), B (blue), and BK (black) to the screen 101 in the darkroom and, with the light measuring device 50C, luminance values and spectrums of reflected lights of the color outputs reflected by the screen 101 are measured.

Measurement results obtained by these kinds of processing are stored in the color-correction-data storing unit 434.

The color-correction-data creating unit 433 creates first color correction data (step S200). The first color correction data is data for performing correction for a change in the brightness of the external lighting 102. Processing in step S200 is explained.

First, in a state in which an output from the projector 4 is not received, the color-correction-data creating unit 433 acquires a detection result of reflected light from the screen 101 of the external lighting 102 from the sensor for colorimetry 551 and measures luminance on the basis of the detection result.

Subsequently, the color-correction-data creating unit 433 standardizes, on the basis of the luminance of reflected light in the darkroom acquired in advance and the luminance of reflected light in a state in which the external lighting 102 is present, γ curves in the darkroom and the state in which the external lighting 102 is present such that luminance obtained when the projector 4 outputs white (in the case of the dark room: Yw, in the case of the presence of the external light: Yw+Yi) is 1. The color-correction-data creating unit 433 superimposes the γ curves at a reference point $D_0$. The reference point $D_0$ is desirably near a half tone (about $0.25 \leq D_0 \leq 0.5$).

The color-correction-data creating unit 433 forms first color correction data such that an output value obtained when the external lighting 102 is present and an output value in the case of the darkroom coincide with each other near the reference point $D_0$. The color-correction-data creating unit 433 reduces a change in a color of an output image due to presence or absence of external lighting by correcting input gradation data such that relative contrast (the tilt of the γ curve) near the reference point $D_0$ does not change according to the presence or absence of the external lighting.

The first color correction data of the colors of RGB calculated in this way is represented by the following expressions. Since a method of calculating the first color correction data is already publicly known (see, for example, JP-A-2002-91415), detailed explanation of the method is omitted.

$$D_{Rout1} = [(1+\alpha_1 \cdot Y_i/Y_w)D_{Rin}^\gamma - (\alpha_1 \cdot Y_i/Y_w)D_0^\gamma]^{1/\gamma} \quad (1)$$

$$D_{Gout1} = [(1+\alpha_1 \cdot Y_i/Y_w)D_{Gin}^\gamma - (\alpha_1 \cdot Y_i/Y_w)D_0^\gamma]^{1/\gamma} \quad (2)$$

$$D_{Bout1} = [(1+\alpha_1 \cdot Y_i/Y_w)D_{Bin}^\gamma - (\alpha_1 \cdot Y_i/Y_w)D_0^\gamma]^{1/\gamma} \quad (3)$$

In the expressions, γ represents a gradation characteristic of the projector 4.

When correction by the first color correction data is excessively applied, it is likely that an image becomes unnatural. Therefore, in this embodiment, a correction amount is multiplied with $\alpha_1$. A value of $\alpha_1$ is preferably within a range of $0.8 \leq \alpha_1 \leq 1$.

When the first color correction data is created (step S200 ends), the color-correction-data creating unit 433 creates second color correction data (steps S202 to S208). Processing for creating the second color correction data (steps S202 to S208) is explained.

The color-patch output unit 432 outputs one color among R (red), G (green), B (blue), and BK (black) to the image processing unit 420 (step S202). Then, the display unit 422 projects the color, which is output from the color-patch output unit 432, to the screen 101 (step S204). As a result, the color-correction-data creating unit 433 acquires, via the sensor for colorimetry 551, a result (a luminance value, spectral reflectance, etc.) obtained by measuring reflected light on the screen 101 of the color output from the color-patch output unit 432.

The color-correction-data creating unit 433 determines whether measurement results of all the colors of R (red), G (green), B (blue), and BK (black) have been acquired (step S206). When measurement results have not been acquired concerning all the colors (NO in step S206), the color-correction-data creating unit 433 returns to the step (step S202) for outputting one color among R (red), G (green), B (blue), and BK (black) to the image processing unit 420.

When measurement results have been acquired concerning all the colors (YES in step S206), the color-correction-data creating unit 433 creates the second color correction data on the basis of measurement values measured in advance (luminance values of reflected lights of R (red), G (green), B (blue), and BK (black) reflected by the reference projection surface and luminance values of reflected light of R (red), G (green), B (blue), and BK (black) reflected by a correction target projection surface) (step S208). The second color correction data is data for performing correction for a change in a color of a projection surface. Processing in step S208 is explained.

First, the color-correction-data creating unit 433 calculates luminance ratios of the RGB colors of the projector 4 on the projection surfaces (the reference projection surface and the screen 101). Subsequently, the color-correction-data creating unit 433 creates, as the second color correction data, correction data that makes the luminance ratio on the screen 101 coincide with the luminance ratio on the reference projection surface. Therefore, changes in chromaticity due to a difference in the projection surface are corrected in all the colors.

The second color correction data of the colors of RGB calculated in this way is represented by the following expressions. Since a method of calculating the second color correction data is already publicly known (see, for example, JP-A-2002-91415), detailed explanation of the method is omitted.

$$D_{Rout2} = [1-\alpha_3\{1-y_R'/\max(y_R',y_G',y_B')\}]^{1/\gamma} \times D_{Rin2} \quad (4)$$

$$D_{Gout2} = [1-\alpha_3\{1-y_G'/\max(y_R',y_G',y_B')\}]^{1/\gamma} \times D_{Gin2} \quad (5)$$

$$D_{Bout2} = [1-\alpha_3\{1-y_B'/\max(y_R',y_G',y_B')\}]^{1/\gamma} \times D_{Bin2} \quad (6)$$

Values obtained by standardizing digital input values of RGB before correction to a range of 0 to 1 are represented as $D_{Rin2}$, $D_{Gin2}$, and $D_{Bin2}$. Values obtained by standardizing digital input values of RGB after correction to a range of 0 to 1 are represented as $D_{Rout2}$, $D_{Gout2}$, and $D_{Bout2}$. Further, $r_R'$, $y_G'$ and $y_B'$ are values obtained by dividing luminance ratios on the reference projection surface by luminance ratios on the screen 101 and $\max(y_R', y_G', y_B')$ indicates maximum values of $y_R'$, $y_G'$, and $y_B'$.

In this way, the change in chromaticity due to the projection surface can be corrected in terms of colorimetry. However, a correction amount $\alpha_3$ ($0<\alpha_3<1$) is adjusted taking into account effects of adaptation of human eyes and of a comparison. When correction of 100% ($\alpha_3=1$) is applied to a color of the projection surface obtained by measurement, correct correction is performed in terms of colorimetry. However, since a color of the projection surface is present around a projection image when the external lighting is present, it looks as if the correction is applied stronger than actual correction because of, for example, effects of a comparison of colors of a projection image and the projection surface and adaptation of the eyes to the external lighting. The correction amount is adjusted in order to eliminate this phenomenon. It is necessary to adjust the correction amount $\alpha_3$ while actually performing evaluation of an image under respective environments. As a value of $\alpha_3$, 0.5 to 1.0 is suitable.

The color-correction-data creating unit 433 ends the second correction data creation processing (steps S202 to S208). Both of the first correction data creation processing (step S200) and the second correction data creation processing (steps S202 to S208) are processing for relatively correcting input values. That is, in Expressions (1) to (3) of the first correction data and Expressions (4) to (6) of the second correction data, input values are multiplied with the correction parameters and output values are obtained. Therefore, the first correction data creation processing (step S200) and the second correction data creation processing (steps S202 to S208) can be performed in the opposite order.

Subsequently, the color-correction-data creating unit 433 acquires a measurement result (a spectrum) of the external lighting 102 from the sensor for light source discrimination 555. The color-correction-data creating unit 433 calculates XYZ or Lab values on the basis of the spectrum. The color-correction-data creating unit 433 calculates, on the basis of a calculation result of the XYZ or Lab values, RGB values necessary for outputting the same color in the projector 4 (step S210).

The color-correction-data creating unit 433 creates, as third color correction data, correction for subtracting, from an output value of RGB of the projector 4, differences between the RGB values acquired in step S210 and average values (step S212). The third color correction data is data for performing correction for the influence of a color of the external lighting 102.

The third color correction data of the colors of RGB obtained in this way is represented by the following expressions. Since a method of calculating the third color correction data is already publicly known (see, for example, JP-A-2002-91415), detailed explanation of the method is omitted.

$$D_{Rout} = (D_{Rin3}{}^\gamma - \alpha_2 \Delta R_{offset})^{1/\gamma} \quad (7)$$

$$D_{Gout} = (D_{Gin3}{}^\gamma - \alpha_2 \Delta G_{offset})^{1/\gamma} \quad (8)$$

$$D_{Bout} = (D_{Bin3}{}^\gamma - \alpha_2 \Delta B_{offset})^{1/\gamma} \quad (9)$$

In the expressions, $\Delta R_{offset}$, $\Delta G_{offset}$, and $\Delta B_{offset}$ are differences between RGB values ri, gi, bi acquired in step S210 and average values. Consequently, a color obtained by superimposing the color of the lighting and the colors of offset have the same chromaticity as gray of the projector 4.

When a correction amount is adjusted taking into account effects of adaptation of human eyes and a comparison, values of $\Delta R_{offset}$, $\Delta G_{offset}$, and $\Delta B_{offset}$ are multiplied with $\alpha_2$ ($0 < \alpha_2 < 1$). When correction of 100% ($\alpha_2 = 1$) is applied to a color of lighting obtained by measurement, correct correction is performed in terms of colorimetry. However, unnatural image representation is sometimes performed because of excessive application of correction. A correction amount is adjusted in order to eliminate this phenomenon. It is necessary to adjust the correction amount $\alpha_2$ while actually performing evaluation of an image under respective environments. As a value of $\alpha_2$, 0.2 to 0.5 is suitable.

Consequently, the first color correction data, the second color correction data, and the third color correction data are created. The color-correction-data creating unit 433 stores the created first color correction data, second color correction data, and third color correction data in the color-correction-data storing unit 434. The color-correction-data selecting unit 435 acquires the first color correction data, the second color correction data, and the third color correction data stored in the color-correction-data storing unit 434 and outputs the first color correction data, the second color correction data, and the third color correction data to the color correcting unit 421.

The color correcting unit 421 acquires image data from the outside (step S214).

The color correcting unit 421 acquires the first color correction data, the second color correction data, and the third color correction data output from the color-correction-data selecting unit 435 and corrects the image data acquired in step S214 using the first color correction data, the second color correction data, and the third color correction data (step S216). Step S216 is explained below.

First, the color correcting unit 421 calculates final correction data obtained by connecting the first color correction data, the second color correction data, and the third color correction data. The data are connected by setting $D_{Rin2}=D_{Rout1}$, $D_{Rin3}=D_{Rout2}$, $D_{Gin2}=D_{Gout1}$, $D_{Gin3}=D_{Gout2}$, $D_{Bin2}=D_{Bout1}$, and $D_{Bin3}=B_{Bout2}$.

The color correcting unit 421 corrects the image data acquired in step S214 using the final correction data. The color correcting unit 421 may apply processing for smoothing a curve to the final correction data.

According to this embodiment, it is possible to display a fixed color irrespective of aged deterioration of a light source and the like and a characteristic of a projection surface by performing color correction corresponding to the aged deterioration of the light source and the like and the characteristic of the projection surface. For example, a projection image projected on the screen 101 looks greatly different depending on a type of the screen 101, a change in a color due to aged deterioration of the projector 4 and the screen 101, and the like. Even when the same white is displayed, the white looks yellowish depending on the type of the screen 101. Even when the same white is displayed, the white looks bright or dark depending on the intensity of the external lighting 102. In this embodiment, it is possible to set a color of a projection image projected on the screen 101 to an appropriate color by acquiring, with the display-color measuring unit 61, light reflected on the screen 101 and acquiring, with the illumination-light measuring unit 62, light emitted by the external lighting 102.

According to this embodiment, it is possible to maintain the appearance of a color irrespective of a type and brightness of lighting in a room. Characteristics of the human eyes change depending on the lighting in the room. However, in this embodiment, it is possible to maintain the appearance of the color by preventing a color felt by a person from changing rather than preventing a display color from physically changing.

In this embodiment, the correction data (the first color correction data, the second color correction data, and the third color correction data) is created using the measurement result of the projection image and the measurement result of the external lighting 102. However, correction data may be stored in advance. For example, color correction data for various types of lighting is created in advance and stored in association with the types of the lighting. A type of lighting is specified on the basis of the measurement result of the external lighting 102. Correction data associated with the specified type of the lighting is selected.

In this embodiment, the color-correction-data creating unit 433 creates the first color correction data, the second color correction data, and the third color correction data. However, it is possible to obtain the effects in this embodiment simply by creating at least one of the first color correction data, the second color correction data, and the third color correction data.

In this embodiment, the light made incident on the illumination-light measuring unit 62 is made incident on the spectroscope 54 (not shown in FIG. 18) of the light measuring device 50C via the optical fiber for light reception 52G and detected by the light receiving unit 55C to detect the light of the external lighting 102. However, a method of detecting the light of the external lighting 102 is not limited to this. For example, in a state in which there is no output from the projector 4, reflected light from the screen 101 of the external lighting 102 may be detected. The detection of the light of the external lighting 102 and the calculation of the third correction data are not essential.

Fifth Embodiment

In the first embodiment of the invention, the light measuring device is disposed on the inside of the printing apparatus. However, a place where the light measuring device can be disposed is not limited to the inside of the printing apparatus.

A fifth embodiment of the invention is a form in which the light measuring device is disposed in a display. A display 5 in the fifth embodiment is explained below. Components same as the components in the first to fourth embodiments are denoted by the same reference numerals and signs and explanation of the components is omitted.

Figure 21:
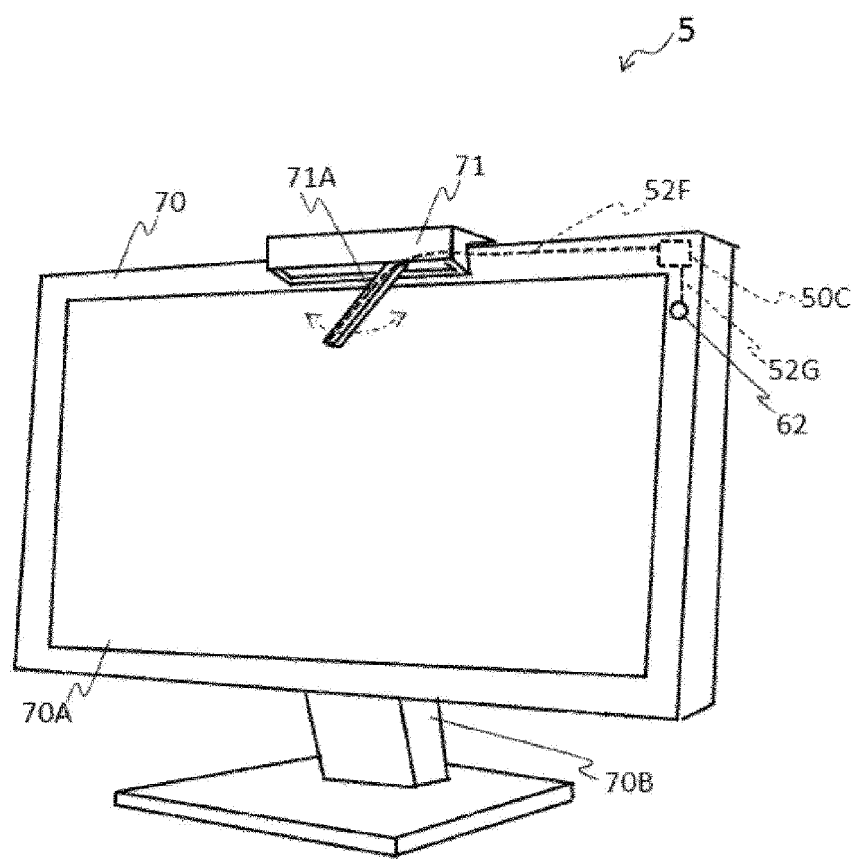
FIG. 21 is a diagram showing an example of the configuration of a display in a fifth embodiment.

FIG. 21 is a diagram showing an example of the configuration of the display 5 in the fifth embodiment of the invention.

In the display 5, a display unit 70A is provided on the front surface of a main body section 70 formed in a substantially rectangular plate shape. The display unit 70A mainly includes a liquid crystal panel exposed on the front surface of the main body section 70 and a backlight functioning as a light source provided on the rear surface of a liquid crystal panel.

The liquid crystal panel is sandwiched by a pair of polarizing plates. ON/OFF of TFTs of pixels is controlled by a voltage applied by a gate driver (explained below). Light transmittance determined by a photoelectric characteristic of a liquid crystal substance is controlled by applying an output voltage (an input level to the liquid crystal panel), which is input by a source driver (explained below), to the TFTs of the pixels in an ON period. Transmission of light from the backlight is adjusted and an image is displayed in gradations.

In this embodiment, a liquid crystal display is adopted as the display unit 70A. However, other display devices such as a CRT may be adopted.

A stand 70B is provided in the back of the main body section 70. The main body section 70 is supported by the stand 70B.

A swing sensor 71 is provided on the upper side of the main body section 70. The swing sensor 71 includes a bar-like light acquiring unit 71A. The optical fiber for light reception 52F is provided on the inside of the light acquiring unit 71A. The distal end of the optical fiber for light reception 52F is exposed from one end of the light acquiring unit 71A. Light displayed on the display unit 70A is made incident on the optical fiber for light reception 52F.

A not-shown turning mechanism is provided at the other end of the light acquiring unit 71A. Consequently, the light acquiring unit 71A can turn in an arrow direction in FIG. 21. The light acquiring unit 71A can receive lights displayed in a plurality of places of the display unit 70A.

On the inside of the main body section 70, a control unit 40D and the light measuring device 50C are mainly provided.

The optical fiber for light reception 52F is connected to the light measuring device 50C. Light made incident on the optical fiber for light reception 52F is made incident on the spectroscope 54 of the light measuring device 50C by the optical fiber for light reception 52F and detected by the light receiving unit 55C.

The illumination-light measuring unit 62 is provided on the front surface of the main body section 70. Light made incident on the illumination-light measuring unit 62 is made incident on the spectroscope 54 of the light measuring device 50C via the optical fiber for light reception 52G and detected by the light receiving unit 55C.

Figure 22:
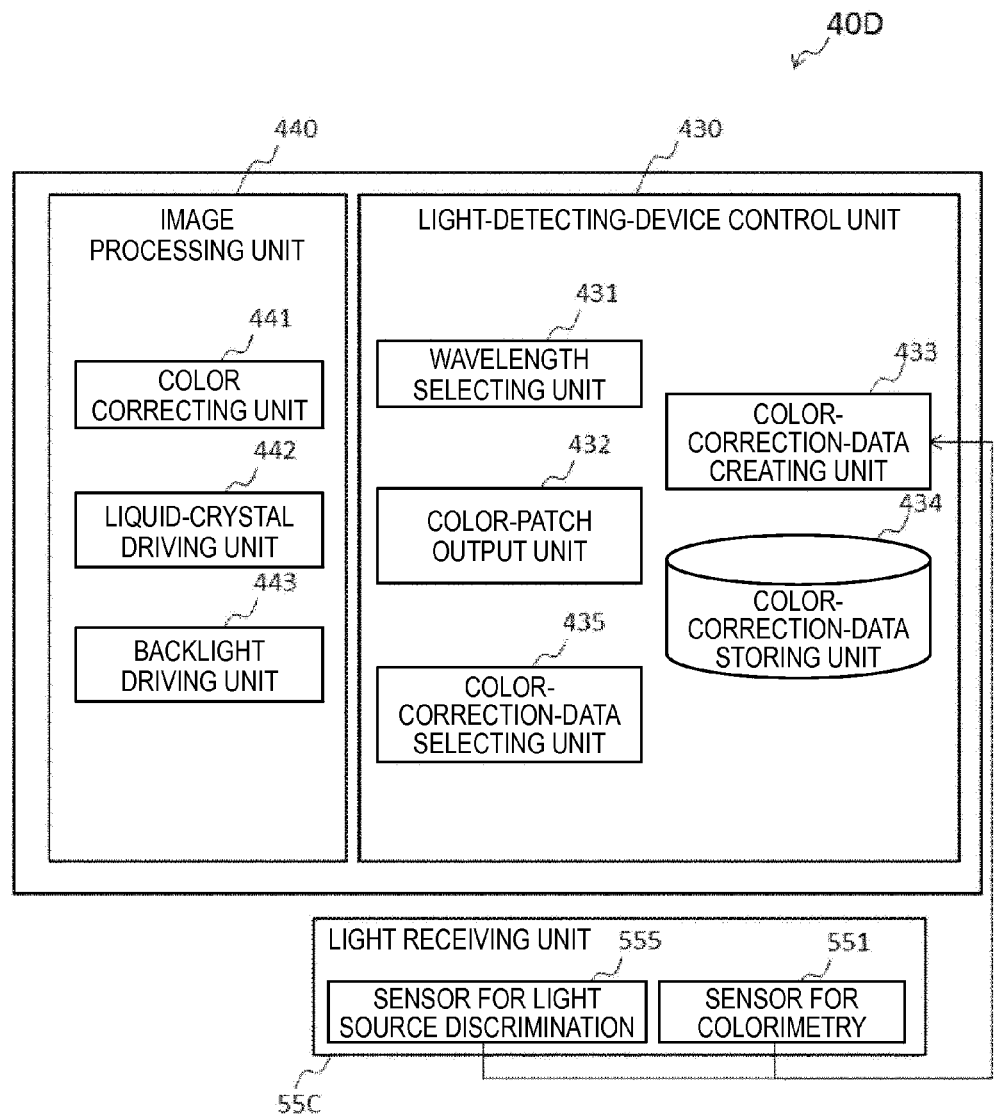
FIG. 22 is a block diagram showing an example of the functional configuration of a control unit.

FIG. 22 is a block diagram showing the electrical configuration of the control unit 40D. The control unit 40D mainly includes an image processing unit 440 and the light-measuring-device control unit 430. Since the light-measuring-device control unit 430 is the same as the light-measuring-device control unit 430 in the fourth embodiment, explanation of the light-measuring-device control unit 430 is omitted.

The image processing unit 440 mainly includes a color correcting unit 441, a liquid-crystal driving unit 442, and a backlight driving unit 443. Since the color correcting unit 441 is the same as the color correcting unit 421 in the fourth embodiment, explanation of the color correcting unit 441 is omitted.

The liquid-crystal driving unit 442 drives the liquid crystal panel on the basis of an image signal input from an external apparatus or the like. A gate driver of the liquid-crystal driving unit 442 selectively applies, according to the input image signal, a voltage to gates of a larger number of TFTs included in the liquid crystal panel. A source driver of the liquid-crystal driving unit 442 applies a voltage to sources of the TFTs at a voltage value corresponding to the input image signal. Consequently, an image is displayed on the liquid crystal panel and a display color of the liquid crystal panel is adjusted. The liquid-crystal driving unit 442 is equivalent to the output unit according to the invention.

The backlight driving unit 443 adjusts an output voltage according to set brightness, gives the output voltage to the backlight, and adjusts the luminance of the backlight. Consequently, the brightness of the liquid crystal panel is adjusted. The backlight driving unit 443 is equivalent to the output unit according to the invention.

Since a flow of processing in the display 5 for performing color correction corresponding to the external lighting 102 or the like and causing the display unit 70A to display an image is the same as the flow of the color correction processing shown in FIG. 20, explanation of the flow is omitted.

According to this embodiment, it is possible to display a fixed color irrespective of aged deterioration of a light source, liquid crystal, a filter, and the like and a characteristic of a projection surface. It is possible to maintain the appearance of a color irrespective of a type and brightness of lighting in a room.

Sixth Embodiment

In the first embodiment of the invention, the light measuring device is disposed on the inside of the printing apparatus. However, the light measuring device is not limited to be disposed on the inside of the printing apparatus or the like.

A sixth embodiment of the invention is a form in which a colorimeter is provided alone. A colorimeter 6 in the sixth embodiment is explained below. Components same as the components in the first embodiment are denoted by the same reference numerals and signs and explanation of the components is omitted.

Figure 23:
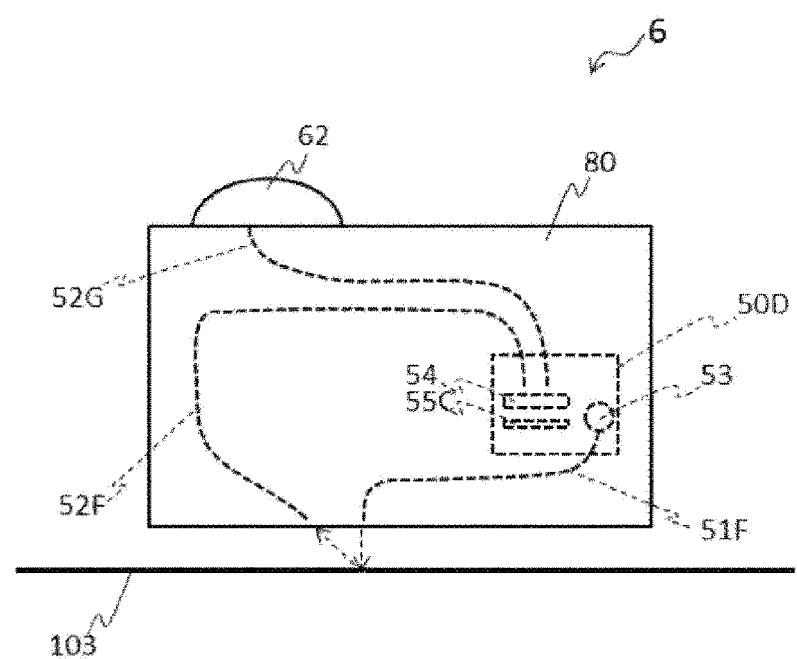
FIG. 23 is a diagram showing an example of the configuration of a colorimeter in a sixth embodiment.

FIG. 23 is a diagram showing an example of the configuration of the colorimeter 6 in the sixth embodiment of the invention.

The colorimeter 6 includes a box-like main body section 80. A light measuring device 50D is provided on the inside of the main body section 80. The light measuring device 50D mainly includes the light source 53, the spectroscope 54, and the light receiving unit 55C.

The illumination-light measuring unit 62 is provided on the upper surface of the main body section 80. Light made incident on the illumination-light measuring unit 62 is made incident on the spectroscope 54 of the light measuring device 50D via the optical fiber for light reception 52G and detected by the light receiving unit 55C.

The light source 53 irradiates light having predetermined intensity to a printing medium 103 via the optical fiber for light source 51F. As shown in FIG. 23, the optical fiber for light source 51F is provided such that light emitted from the optical fiber for light source 51F is perpendicularly made incident on the printing medium 103.

The light reflected on the printing medium 103 is made incident on the optical fiber for light reception 52F. The optical fiber for light reception 52F is provided such that the light reflected at 45 degrees with respect to the surface of the printing medium 103 is made incident on the optical fiber for light reception 52F. The light guided by the optical fiber for light reception 52F is made incident on the spectroscope 54 of the light measuring device 50D and detected by the light receiving unit 55C.

In this embodiment, the light is perpendicularly made incident on the printing medium 103 and the light reflected at 45 degrees is detected. However, the light may be made incident on the printing medium 103 at 45 degrees and the light reflected perpendicularly may be detected.

The colorimeter 6 includes a light-measuring-device control unit (not shown in the figure). A light-measuring-device control unit 410C includes the wavelength selecting unit 411 (see FIG. 7) and a detection-result acquiring unit (not shown in the figure).

When wavelengths of lights detected by the light receiving unit 55C are selected by the wavelength selecting unit 411 and a measurement result for each of the selected wavelengths of the lights is input to the detection-result acquiring unit, the detection-result acquiring unit acquires the spectral reflectance of the light reflected on the printing medium 103 and the spectrum of the external lighting 102 (not shown in FIG. 23). The measurement result acquired by the detection-result acquiring unit can be output to an external apparatus or the like. For example, the detection-result acquiring unit may output color values such as XYZ or Lab values or may output a spectrum or spectral reflectance. If a media profile (see the first embodiment) is created by the external apparatus to which the color values are output, it is possible to perform adjustment of printing on the printing medium 103.

According to this embodiment, it is possible to simultaneously acquire a color of an object and a color of lighting.

A result of the acquisition can be used as information for learning in what kind of a color a print is seen under an environment in which the colorimeter performs measurement. The result of the acquisition can also be used as information for maintaining the appearance of a color irrespective of external lighting.

The invention is explained above with reference to the embodiments. However, the technical scope of the invention is not limited to the scope described in the embodiments. It is evident for those skilled in the art that various modifications or improvements can be applied to the embodiments. It is evident from the description of the appended claims that forms applied with such modifications or improvements could be included in the technical scope of the invention. Further, it is possible to carry out a plurality of embodiments in combination.

In particular, the invention may be provided as an apparatus such as a printing apparatus, a projector, or a display provided with a light measuring device or may be provided as the light measuring device. The invention can also be provided as a computer program for controlling the light measuring device or the like or a storage medium having stored therein the computer program.

The entire disclosure of Japanese Patent Application Nos. 2013-054681, filed Mar. 18, 2013 and 2014-031414, filed Feb. 21, 2014 are expressly incorporated by reference herein.

What is claimed is:

1. A light measuring device comprising:
a spectroscope configured to selectively transmit light having a desired wavelength;
a plurality of light guiding units configured to guide measurement target light to the spectroscope; and
a light receiving unit configured to receive the light emitted from the spectroscope, wherein
the plurality of light guiding units are provided in positions where different lights are respectively made incident on incident ends of the plurality of light guiding units and in positions where emission ends of the plurality of light guiding units respectively emit lights to different positions of the spectroscope,
the spectroscope emits lights, which are made incident from the plurality of light guiding units, respectively from different positions, and
the light receiving unit separately receives the lights emitted from the different positions of the spectroscope.

2. The light measuring device according to claim 1, wherein
the light receiving unit is an area sensor in which a plurality of sensors are arranged, and
the lights made incident on the spectroscope from the plurality of light guiding units are received by different sensors of the area sensor.

3. The light measuring device according to claim 1, further comprising a control unit configured to control the light measuring device, wherein
the control unit includes:
a wavelength selecting unit configured to select a wavelength transmitted through the spectroscope; and
an acquiring unit configured to acquire, while changing the desired wavelength with the wavelength selecting unit, a light reception result in the light receiving unit to acquire a relation between a wavelength and light intensity of the measurement target light.

4. The light measuring device according to claim 3, further comprising an output unit configured to output the measurement target light or output a color onto a medium on which light is reflected to be the measurement target light, wherein
the control unit includes an information creating unit configured to create, on the basis of the relation between the wavelength and the light intensity of the measurement target light acquired by the acquiring unit, correction information for correcting the output of the output unit.

5. A printing apparatus that prints an image on a printing medium, the printing apparatus comprising:
the light measuring device according to claim 3;
a printing-medium-discrimination-information acquiring unit configured to acquire printing medium discrimination information that associates information specifying a printing medium with respect to a plurality of printing media and a relation between a wavelength and light intensity of light reflected on the printing medium; and a printing-medium discriminating unit configured to discriminate a type of the printing medium on the basis of the printing medium discrimination information and the relation between the wavelength and the light intensity of the measurement target light acquired by the acquiring unit.

6. The printing apparatus according to claim 5, wherein the light guiding unit guides diffused reflected light of the printing medium and regular reflection light of the printing medium or transmitted light of the printing medium to the spectroscope.

7. A printing apparatus that prints an image on a printing medium, the printing apparatus comprising the light measuring device according to claim 4, wherein the output unit ejects ink to the printing medium, the light receiving unit receives light reflected on the printing medium to which the ink is ejected by the output unit, and the information creating unit creates, as the correction information, information specifying a relation between a color value and an ink amount on the printing medium.

8. The printing apparatus according to claim 7, wherein the plurality of light guiding units are provided in positions where lights reflected in different positions on the printing medium can be simultaneously acquired.

9. An image display apparatus that causes a display unit, which is a display screen or a projection surface, to display an image, the image display apparatus comprising:

the light measuring device according to claim 4; and an acquiring unit configured to acquire image data, wherein the output unit causes the display unit to display a predetermined color, the light guiding unit emits the predetermined color displayed on the display unit to the spectroscope as the measurement target light, and the information creating unit creates correction data used for color correction performed when the output unit outputs the image data.

10. The image display apparatus according to claim 9, wherein the light guiding unit emits, together with the predetermined color, light of external lighting to the spectroscope as the measurement target light, and the information creating unit creates the correction data on the basis of the light of the external lighting.

* * * * *